(12) United States Patent
Kawano et al.

(10) Patent No.: US 10,540,968 B2
(45) Date of Patent: Jan. 21, 2020

(54) INFORMATION PROCESSING DEVICE AND METHOD OF INFORMATION PROCESSING

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 229 days.

(21) Appl. No.: 15/528,878

(22) PCT Filed: Aug. 24, 2015

(86) PCT No.: PCT/JP2015/073747
§ 371 (c)(1),
(2) Date: May 23, 2017

(87) PCT Pub. No.: WO2016/088411
PCT Pub. Date: Jun. 9, 2016

(65) Prior Publication Data
US 2017/0337920 A1    Nov. 23, 2017

(30) Foreign Application Priority Data

Dec. 2, 2014 (JP) ................................. 2014-243904

(51) Int. Cl.
*G10L 15/22* (2006.01)
*G10L 15/04* (2013.01)
(Continued)

(52) U.S. Cl.
CPC ............ *G10L 15/22* (2013.01); *G06F 3/0482* (2013.01); *G06F 3/167* (2013.01); *G10L 15/04* (2013.01); *G10L 25/84* (2013.01)

(58) Field of Classification Search
None
See application file for complete search history.

(56) References Cited

U.S. PATENT DOCUMENTS

| 5,784,670 A * | 7/1998 | Sasahara .................. B41J 29/38 |
| | | 381/73.1 |
| 6,044,341 A * | 3/2000 | Takahashi .............. H04B 15/00 |
| | | 704/226 |

(Continued)

FOREIGN PATENT DOCUMENTS

| JP | 2002-278591 A | 9/2002 |
| JP | 2007-264229 A | 10/2007 |
| JP | 2008-009153 A | 1/2008 |

OTHER PUBLICATIONS

Takanobu Oba, "Analysis of the Relation between Grammar and Recognition Accuracy in Spoken Dialogues under Different Noisy Environments", IEICE Technical Report, vol. 103, No. 517, 2003 (English Abstract Only).

(Continued)

*Primary Examiner* — Thuykhanh Le
(74) *Attorney, Agent, or Firm* — Chip Law Group

(57) ABSTRACT

Provided is an information processing device including a processing unit acquisition portion that acquires one or more processing units, on the basis of noise, from a first recognition string obtained by performing speech recognition on first input speech, and a processor that processes a processing target, when any one of the one or more processing units is selected as the processing target.

21 Claims, 37 Drawing Sheets

(51) Int. Cl.
*G06F 3/0482* (2013.01)
*G06F 3/16* (2006.01)
*G10L 25/84* (2013.01)

(56) References Cited

U.S. PATENT DOCUMENTS

| | | | | |
|---|---|---|---|---|
| 6,178,399 | B1* | 1/2001 | Takebayashi | G10L 15/063 704/233 |
| 7,783,028 | B2* | 8/2010 | Bantz | H04M 3/51 379/265.06 |
| 8,255,209 | B2* | 8/2012 | Kong | G10L 21/0208 381/92 |
| 9,401,140 | B1* | 7/2016 | Weber | G10L 15/00 |
| 9,779,724 | B2* | 10/2017 | Gruenstein | G10L 15/08 |
| 2002/0035471 | A1* | 3/2002 | Breton | G10L 15/20 704/233 |
| 2002/0049587 | A1* | 4/2002 | Miyazawa | G10L 15/20 704/233 |
| 2004/0002867 | A1* | 1/2004 | Nakagawa | G10L 15/20 704/275 |
| 2005/0182629 | A1* | 8/2005 | Coorman | G10L 13/06 704/266 |
| 2007/0050190 | A1* | 3/2007 | Washio | G10L 15/22 704/249 |
| 2008/0010057 | A1* | 1/2008 | Chengalvarayan | G10L 15/065 704/9 |
| 2009/0055175 | A1* | 2/2009 | Terrell, II | G10L 15/01 704/235 |
| 2009/0076810 | A1* | 3/2009 | Matsuo | H03G 3/32 704/225 |
| 2009/0112588 | A1* | 4/2009 | Kummamuru | G06F 16/355 704/245 |
| 2009/0234647 | A1* | 9/2009 | Scholz | G10L 15/30 704/235 |
| 2010/0268533 | A1* | 10/2010 | Park | G10L 25/78 704/233 |
| 2011/0307253 | A1* | 12/2011 | Lloyd | G10L 15/20 704/233 |
| 2011/0313762 | A1* | 12/2011 | Ben-David | G10L 13/08 704/231 |
| 2012/0017159 | A1* | 1/2012 | Roh | G06F 16/9577 715/760 |
| 2013/0080056 | A1* | 3/2013 | Homma | G10L 21/0208 701/537 |
| 2013/0085749 | A1* | 4/2013 | Watanabe | G06F 3/165 704/201 |
| 2013/0117027 | A1* | 5/2013 | Choi | G06F 3/04842 704/275 |
| 2013/0185066 | A1* | 7/2013 | Tzirkel-Hancock | G10L 15/20 704/233 |
| 2013/0185078 | A1* | 7/2013 | Tzirkel-Hancock | G10L 15/22 704/275 |
| 2013/0204607 | A1* | 8/2013 | Baker, IV | G10L 17/005 704/8 |
| 2013/0218575 | A1* | 8/2013 | Konishi | G10L 25/60 704/275 |
| 2013/0293747 | A1* | 11/2013 | Yoshizuka | G10L 21/0232 348/241 |
| 2014/0163983 | A1* | 6/2014 | Kim | G06F 3/167 704/235 |
| 2014/0278389 | A1* | 9/2014 | Zurek | G10L 15/20 704/231 |
| 2014/0372121 | A1* | 12/2014 | Togawa | G10L 13/027 704/254 |
| 2015/0019074 | A1* | 1/2015 | Winter | G10L 15/01 701/36 |
| 2015/0032445 | A1* | 1/2015 | Souden | G10L 21/0264 704/208 |
| 2015/0088501 | A1* | 3/2015 | Recker | H04R 25/43 704/235 |
| 2015/0279363 | A1* | 10/2015 | Furumoto | G10L 15/32 704/249 |

OTHER PUBLICATIONS

International Search Report and Written Opinion of PCT Application No. PCT/JP2015/073747, dated Sep. 29, 2015, 06 pages of English Translation and 06 pages of ISRWO.

International Preliminary Report on Patentability of PCT Application No. PCT/JP2015/073747, dated Jun. 15, 2017, 07 pages of English Translation and 03 pages of IPRP.

* cited by examiner

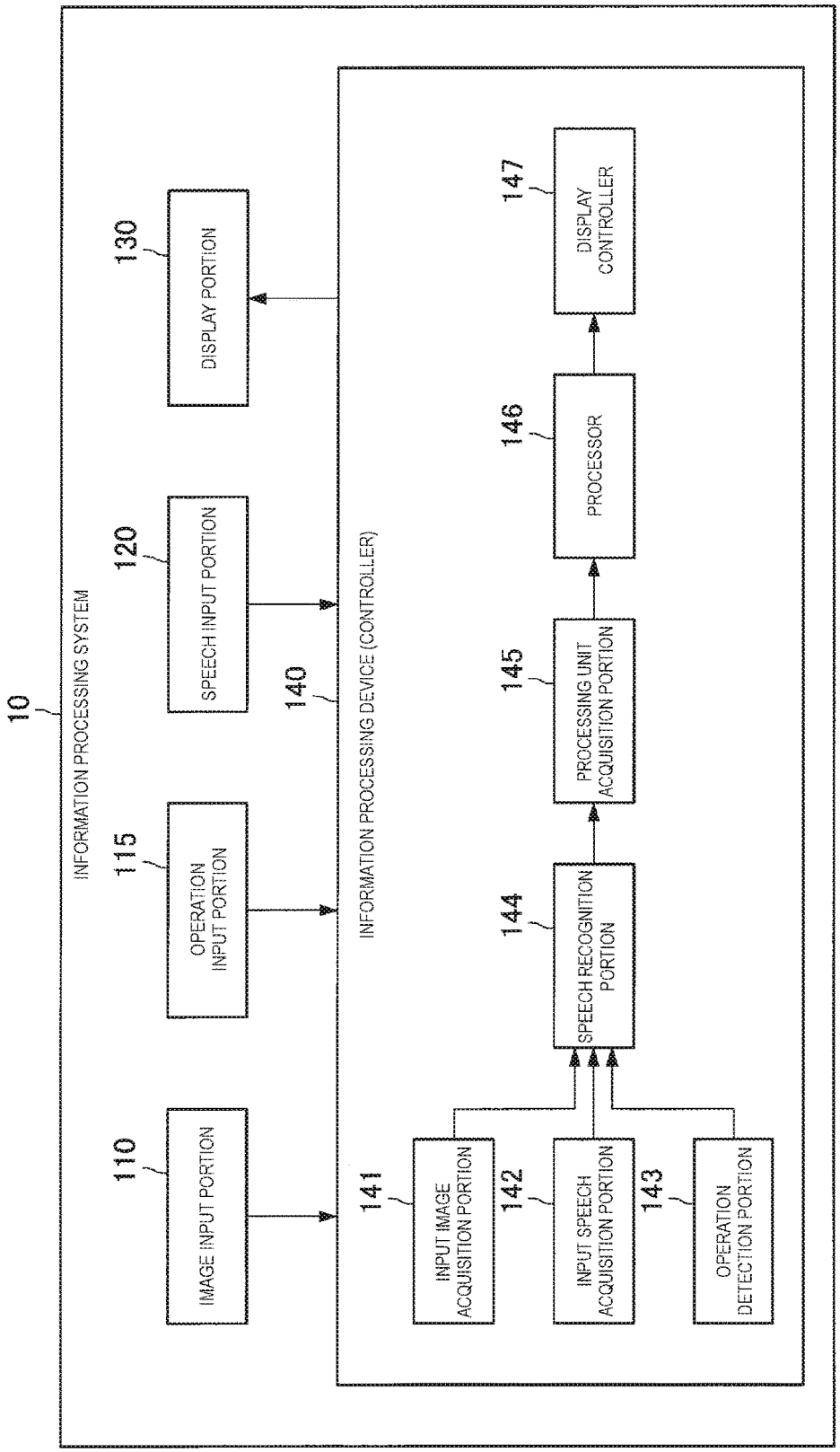

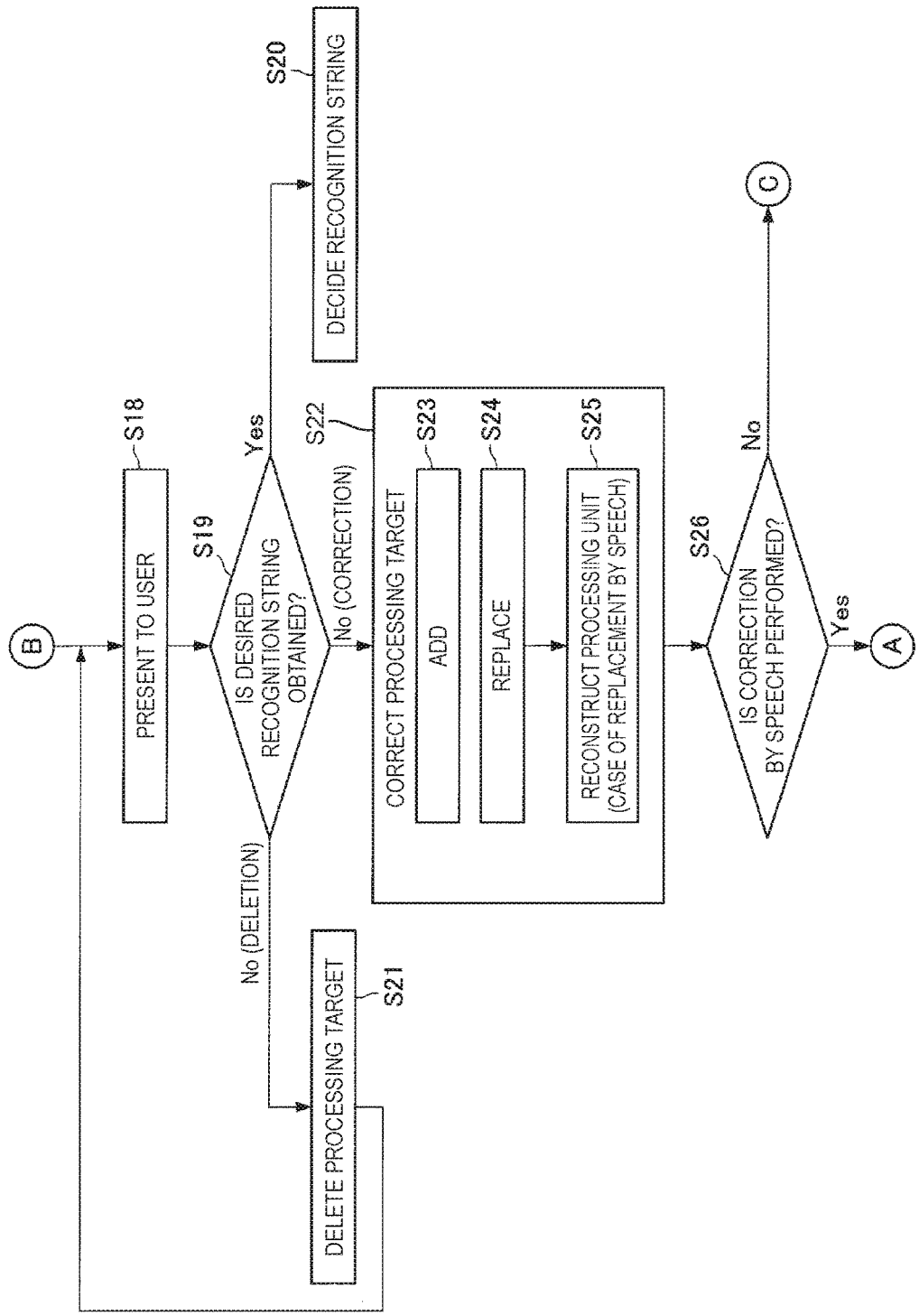

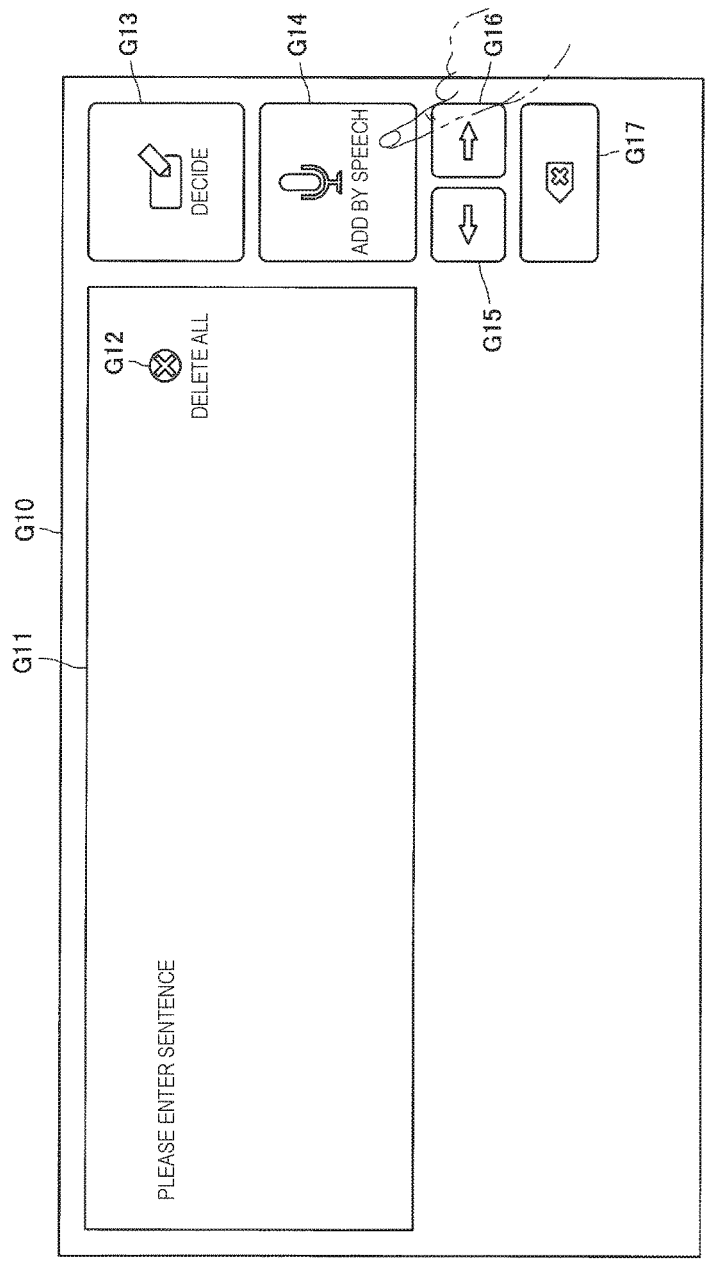

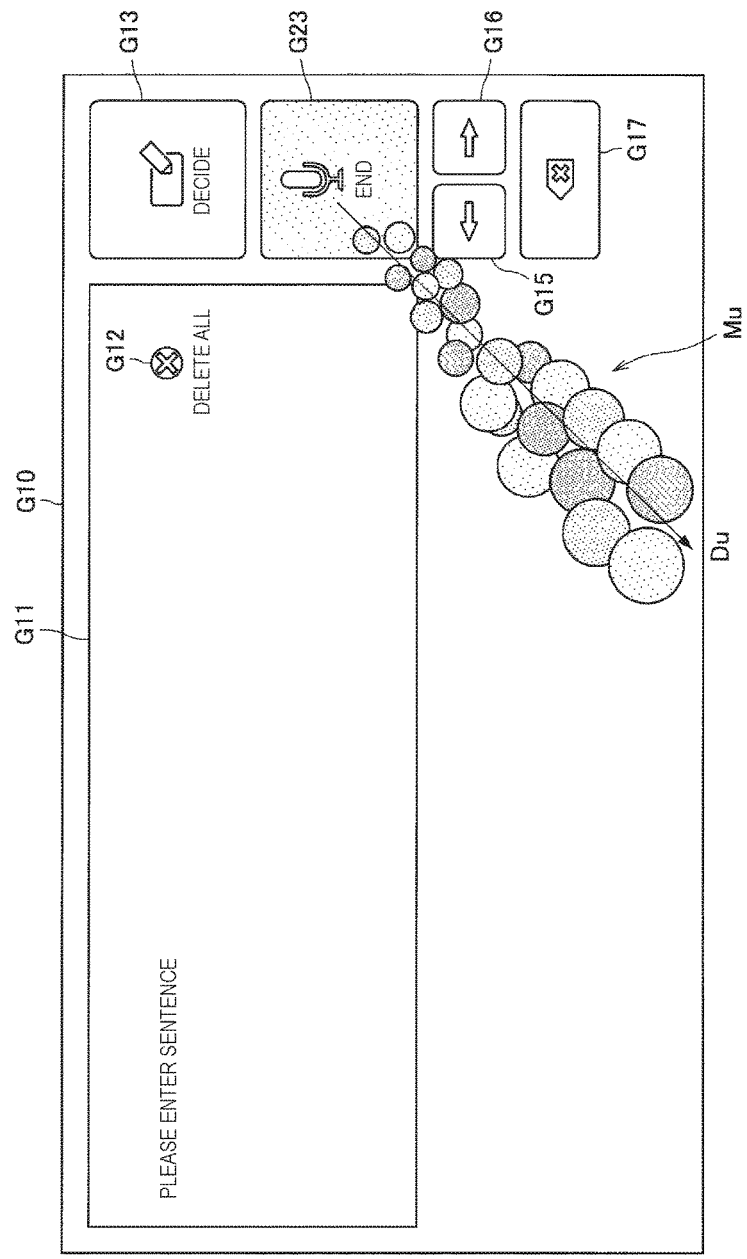

FIG.6

STRING USER WISH TO INPUT

I drive your car to airports

RECOGNITION STRING OBTAINED BY SPEECH RECOGNITION

I drove your car to airports

FIG.8

| SMALL NOISE VOLUME | I/ drove/ your/ car/ to/ airports |
| MIDDLE NOISE VOLUME | I drove/ your car/ to airports |
| LARGE NOISE VOLUME | I drove your car to airports |

FIG.11

| PREDICTIVE CONVERSION CATEGORY DB ||
|---|---|
| drove | drove safely, drove out |
| ... | ... |

FIG.12

| PHRASE CATEGORY DB ||
|---|---|
| drove | drove a, drove at, drove away, drove for, drove off, drove on, drove to, drove up, drove with, drove by, drove in |
| ... | ... |

FIG.13

| ORIGINAL FORM CATEGORY DB ||
|---|---|
| drove | drive |
| ... | ... |

FIG.14

| PREVIOUS CORRECTION RESULT CATEGORY DB ||
|---|---|
| drove | I drive, in drive |
| ... | ... |

FIG.15

| SIMILAR SOUND CATEGORY DB ||
|---|---|
| live | leave |
| ... | ... |

FIG.16

| SIMILAR SEMANTIC CATEGORY DB | |
|---|---|
| view | see, consider, regard, find out, discover |
| ... | ... |

FIG.17

| CONVERSION FORM CATEGORY DB | |
|---|---|
| good | better, best |
| help | helps, helping, helped, helpful, helper |
| ... | ... |

FIG.23

| SYMBOL CATEGORY DB |
|---|
| ( PERIOD ), (COMMA), ?, !, (space), (CR), \, &, @, #, -, ... |

FIG.24

| NUMERAL CATEGORY DB |
|---|
| 0, 1, 2, 3, 4, 5, 6, 7, 8, 9, 10, 11, 12, ... |

FIG.25

| ALPHABET CATEGORY DB |
|---|
| a, b, c, d, ..., A, B, C, D, ... |

FIG.26

| EMOTICON CATEGORY DB |
|---|
| (^^), (=o=), (-_-), m(__)m, ... |

FIG.32
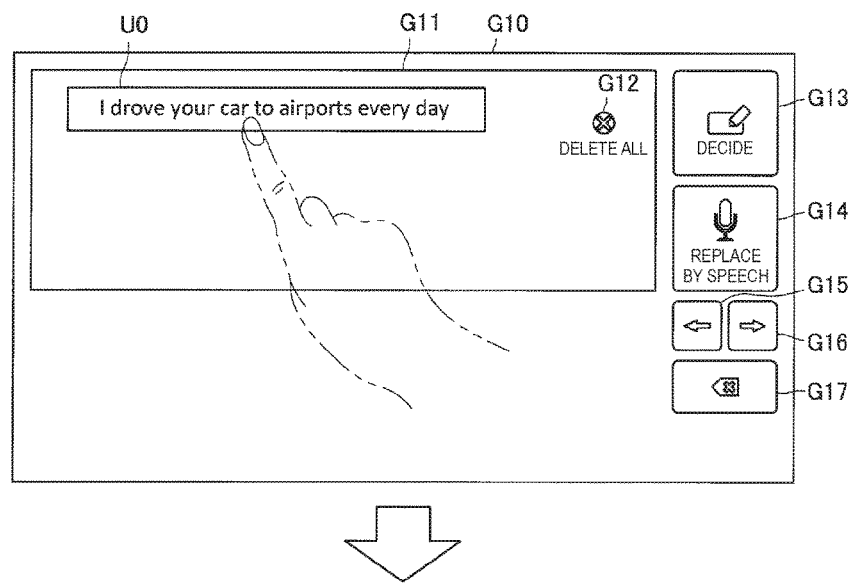
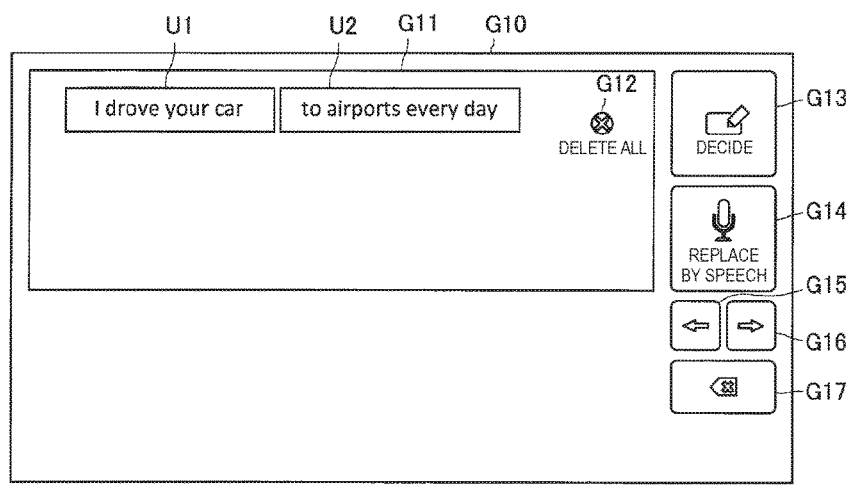

FIG.35
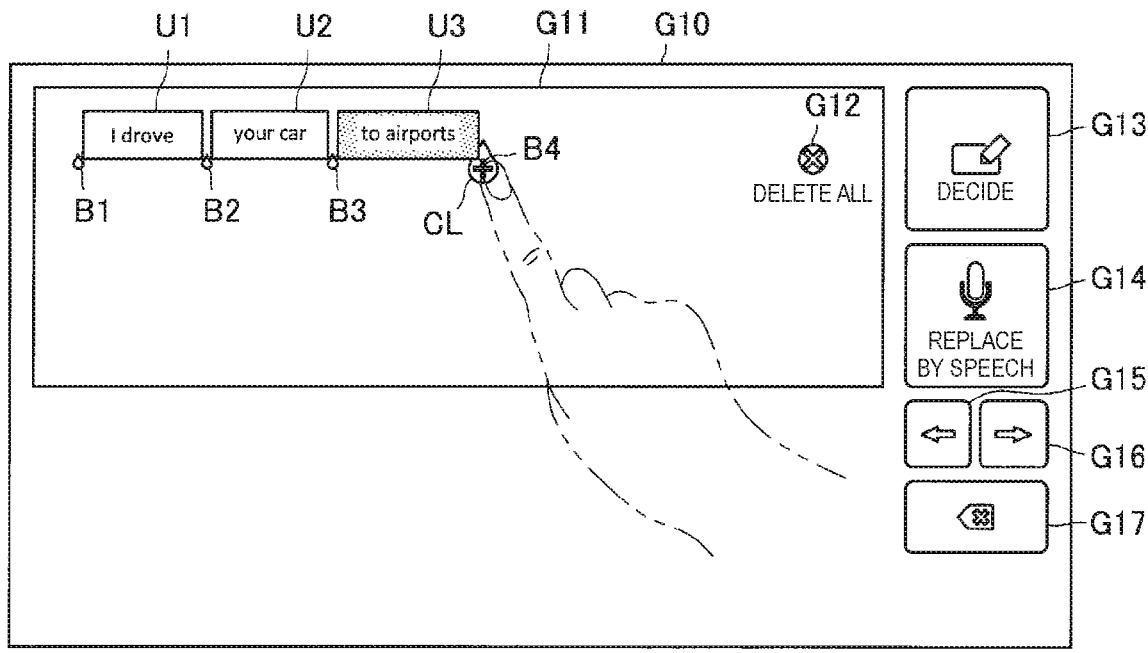
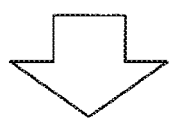
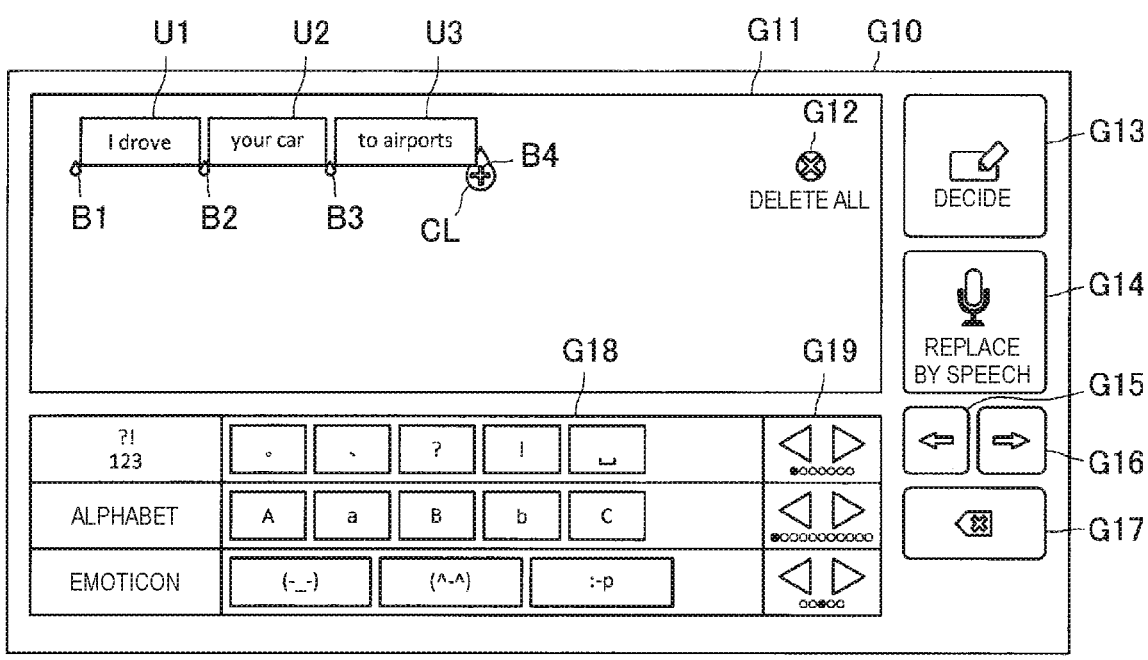

FIG.36
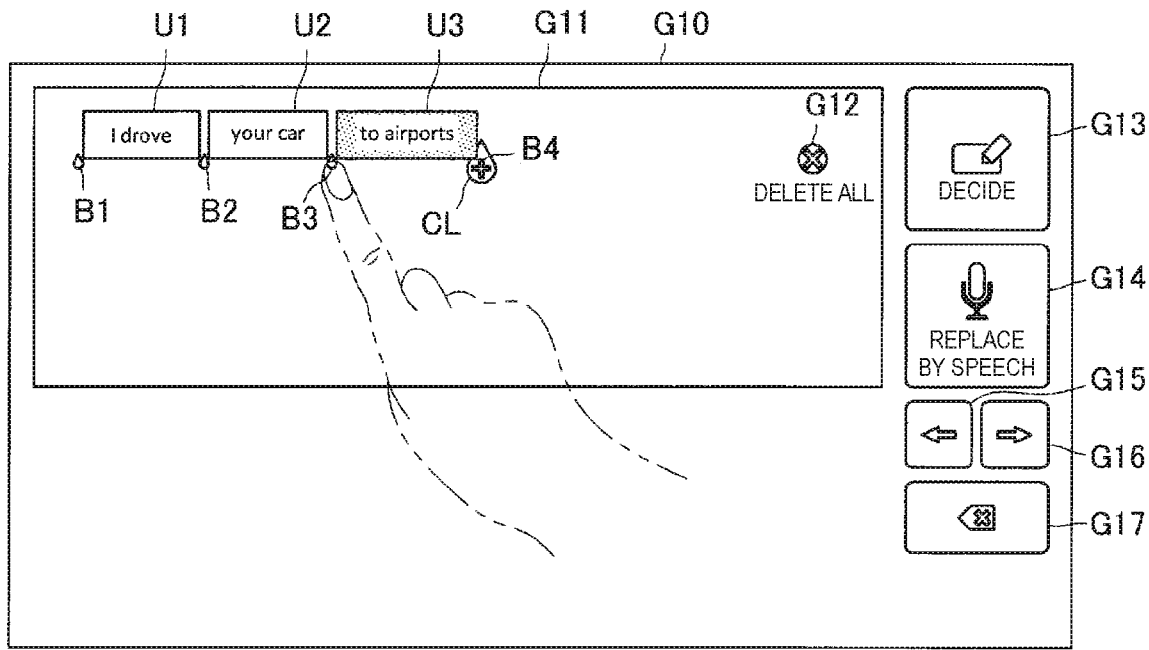
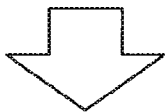
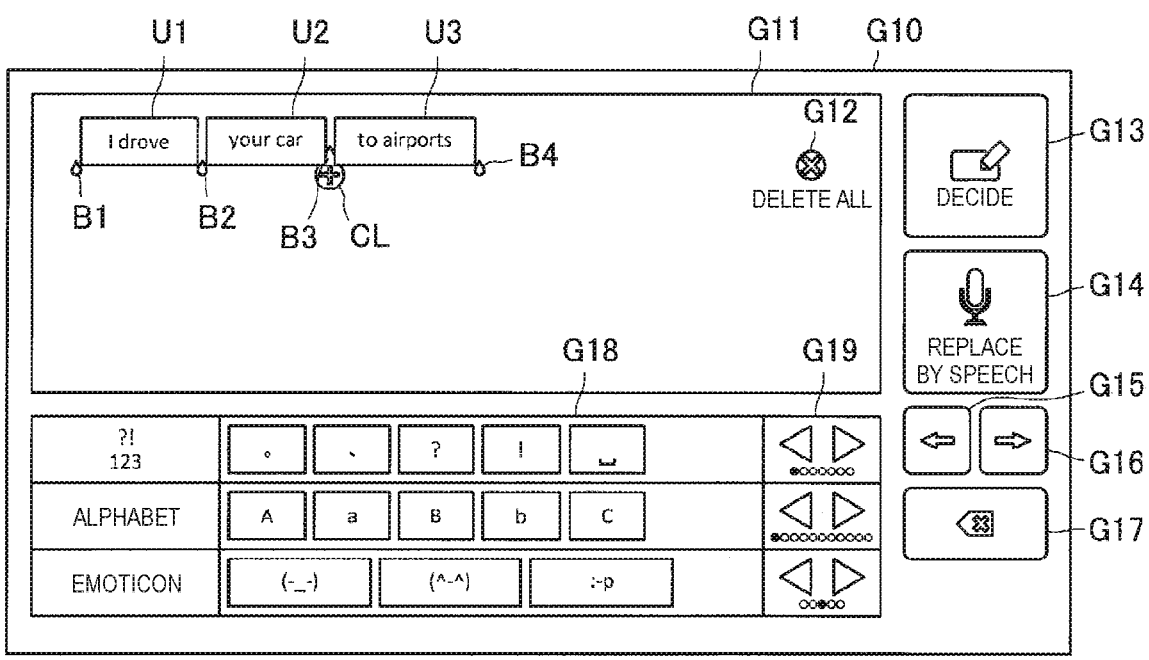

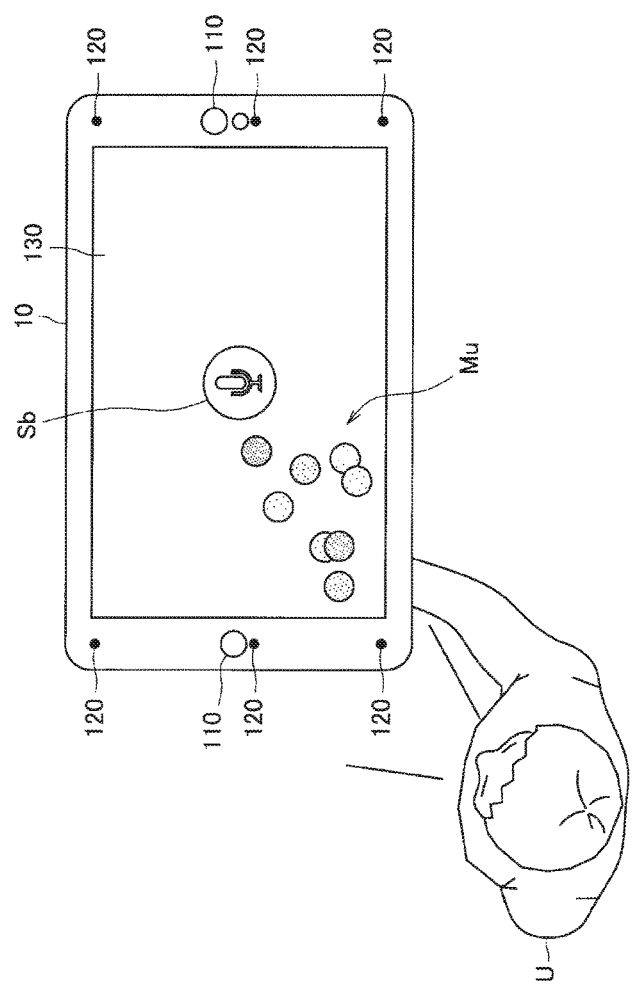

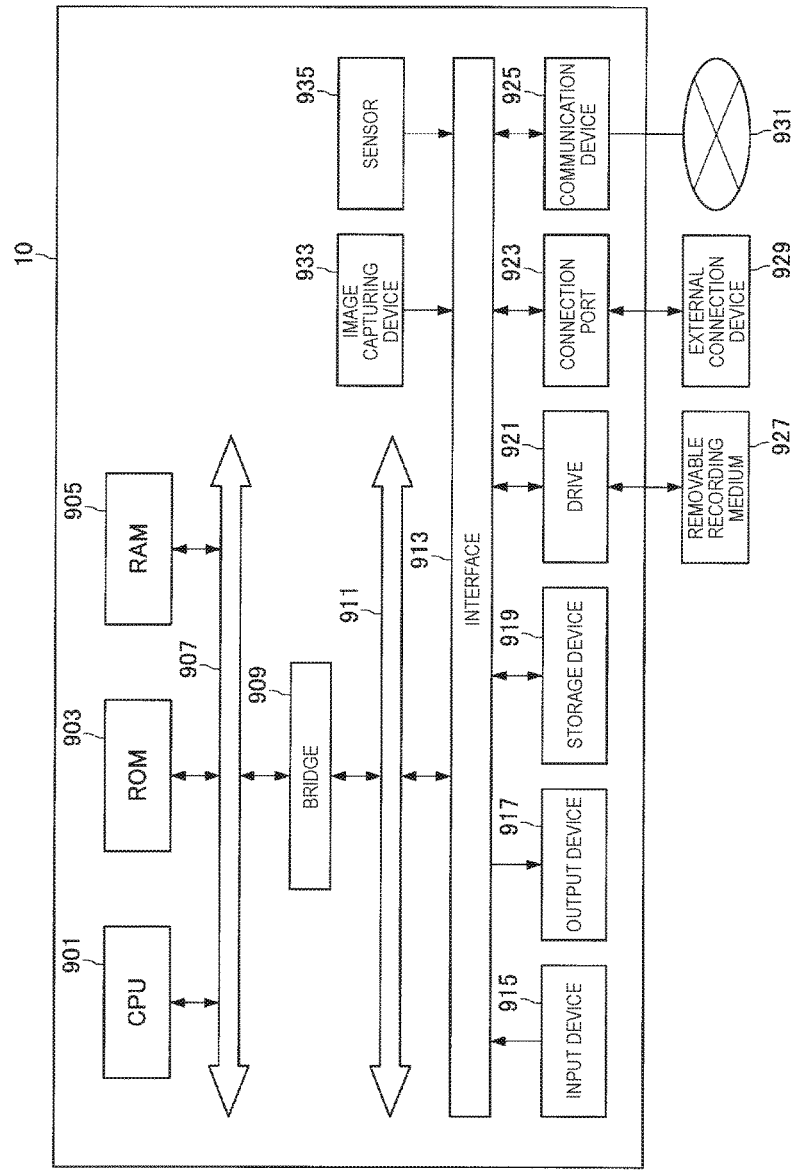

INFORMATION PROCESSING DEVICE AND METHOD OF INFORMATION PROCESSING

CROSS REFERENCE TO RELATED APPLICATIONS

This application is a U.S. National Phase of International Patent Application No. PCT/JP2015/073747 filed on Aug. 24, 2015, which claims priority benefit of Japanese Patent Application No. JP 2014-243904 filed in the Japan Patent Office on Dec. 2, 2014. Each of the above-referenced applications is hereby incorporated herein by reference in its entirety.

TECHNICAL FIELD

The present disclosure relates to an information processing device, a method of information processing, and a program.

BACKGROUND ART

Technologies for accepting speech uttered from a user as input speech and performing speech recognition on the input speech to recognize strings from input speech have been recently developed. However, errors may be likely to occur in speech recognition. In this regard, there has been developed a technique of generating a plurality of processing units except some strings from strings recognized from the input speech, presenting them to a user, and regarding a processing unit selected by a user from a plurality of processing units as a target to be processed (e.g., refer to Patent Literature 1).

CITATION LIST

Patent Literature

Patent Literature 1: JP 2008-209717A

DISCLOSURE OF INVENTION

Technical Problem

Therefore, it is desirable to provide technology capable of performing processing on a string recognized from input speech more efficiently.

Solution to Problem

According to the present disclosure, there is provided an information processing device including: a processing unit acquisition portion configured to acquire one or more processing units, on the basis of noise, from a first recognition string obtained by performing speech recognition on first input speech; and a processor configured to, when any one of the one or more processing units is selected as a processing target, process the processing target.

According to the present disclosure, there is provided a method of information processing, the method including: acquiring one or more processing units, on the basis of noise, from a first recognition string obtained by performing speech recognition on first input speech; and when any one of the one or more processing units is selected as a processing target, processing the processing target.

According to the present disclosure, there is provided a program for causing a computer to function as an information processing device including: a processing unit acquisition portion configured to acquire one or more processing units, on the basis of noise, from a first recognition string obtained by performing speech recognition on first input speech; and a processor configured to, when any one of the one or more processing units is selected as a processing target, process the processing target.

Advantageous Effects of Invention

According to the present disclosure as described above, technology capable of performing processing on a string recognized from input speech more efficiently is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a block diagram illustrating a functional configuration example of the information processing system according to the embodiment.

FIG. 3B is a flowchart showing an overview of an operation of an information processing device according to the embodiment.

FIG. 4 is a diagram illustrating a configuration example of a screen displayed on a display portion by a display controller.

FIG. 5 is a diagram illustrating an example of a screen displayed in a state in which a user is speaking.

FIG. 6 is a diagram illustrating an example of a string that the user wishes to enter and an example of a recognition string obtained by speech recognition.

FIG. 8 is a diagram illustrated to describe an example of acquiring one or a plurality of processing units from a recognition string on the basis of a noise volume.

FIG. 11 is a diagram illustrating an example of a predictive conversion category database.

FIG. 12 is a diagram illustrating an example of a Phrase category database.

FIG. 13 is a diagram illustrating an example of an original form category database.

FIG. 14 is a diagram illustrating an example of a previous correction result category database.

FIG. 15 is a diagram illustrating an example of a similar sound category database.

FIG. 16 is a diagram illustrating an example of a similar semantic category database.

FIG. 17 is a diagram illustrating an example of a conversion form category database.

FIG. 23 is a diagram illustrating an example of a symbol category database.

FIG. 24 is a diagram illustrating an example of a numeral category database.

FIG. 25 is a diagram illustrating an example of an alphabet category database.

FIG. 26 is a diagram illustrating an example of an emoticon category database.

FIG. 32 is a diagram illustrated to describe an example of changing the number of processing units.

FIG. 35 is a diagram illustrated to describe selection of a caret position.

FIG. 36 is a diagram illustrated to describe selection of a caret position.

FIG. 43 is a diagram illustrating a modified example of a display form by a display portion.

FIG. 44 is a block diagram illustrating a hardware configuration example of the information processing system according to the embodiment.

MODE(S) FOR CARRYING OUT THE INVENTION

Figure 1:
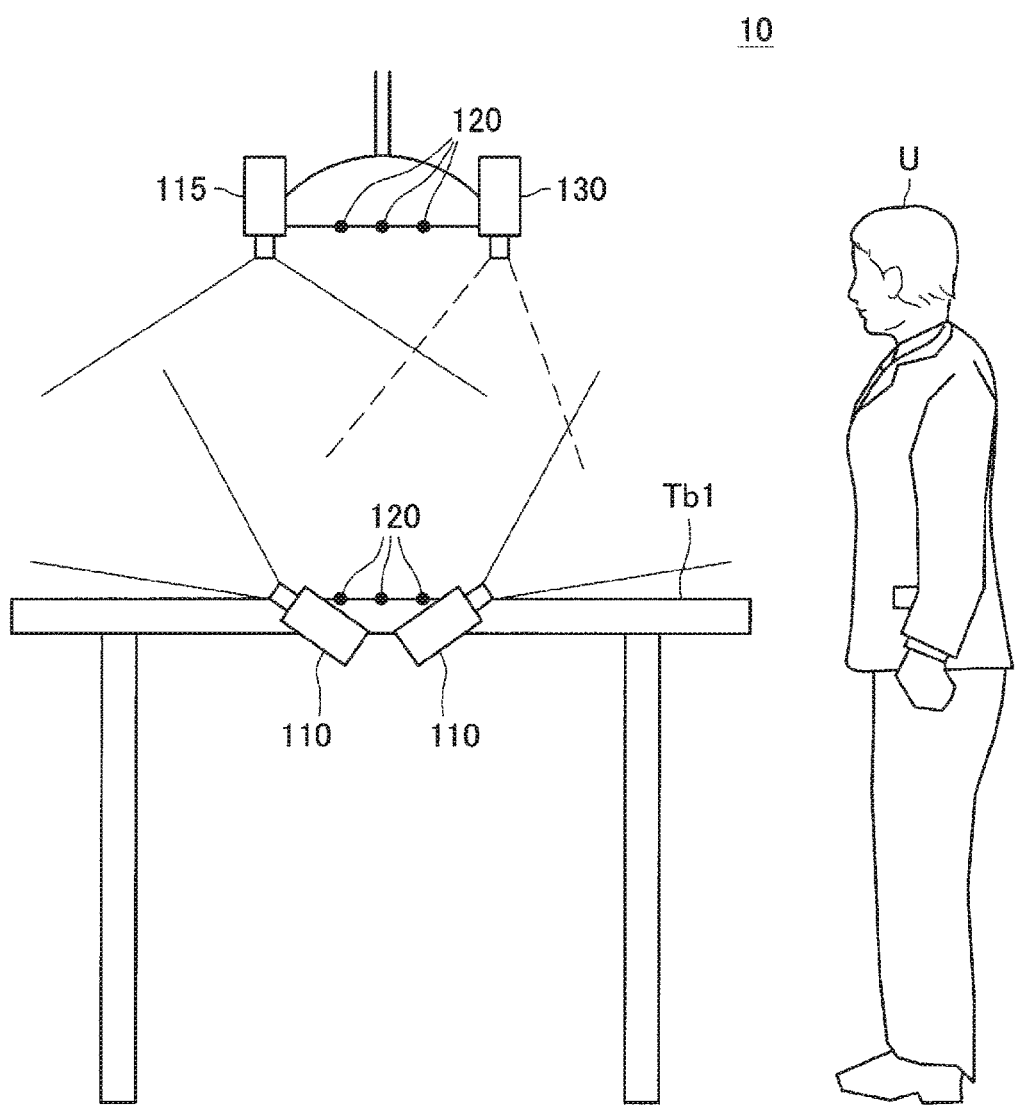
FIG. 1 is a diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

The description will be given in the following order.
1. Embodiment of present disclosure
1.1. System configuration example
1.2. Functional configuration example
1.3. Overview of operation
1.4. Screen configuration example
1.5. Determination of processing unit
1.6. Presentation of string
1.7. Control of length of processing target
1.8. Change in the number of processing units
1.9. Deletion of processing unit
1.10. Selection of caret position
1.11. Display area of processing unit
1.12. Modified example of display form
1.13. Hardware configuration example
2. Conclusion

1. Embodiment of Present Disclosure

[1.1. System Configuration Example]

A configuration example of an information processing system 10 according to an embodiment of the present disclosure is described with reference to the drawings. FIG. 1 is a diagram illustrating a configuration example of the information processing system 10 according to an embodiment of the present disclosure. As illustrated in FIG. 1, the information processing system 10 according to the embodiment of the present disclosure is configured to include an image input portion 110, an operation input portion 115, a speech input portion 120, and a display portion 130. The information processing system 10 is capable of performing speech recognition on the speech uttered by a user U (hereinafter also simply referred to as "user").

The image input portion 110 has a function of inputting an image. In the example illustrated in FIG. 1, the image input portion 110 includes two cameras embedded in a table Tb1. However, the number of cameras included in the image input portion 110 is not limited to the particular number as long as it is one or more. In such a case, the position where each of one or more cameras included in the image input portion 110 is provided is also not limited to a particular position. In addition, one or more cameras may include a monocular camera or a stereo camera.

The operation input portion 115 has a function of inputting an operation of the user U. In the example illustrated in FIG. 1, the operation input portion 115 includes one camera suspended from the ceiling above the table Tb1. However, the position at which the camera included in the operation input portion 115 is provided is not limited to a particular position. In addition, the camera may include a monocular camera or a stereo camera. In addition, the operation input portion 115 may be anything other than a camera as long as it has a function of inputting the operation of the user U, and may be, for example, a touch panel or a hardware button.

The display portion 130 has a function of displaying a screen on the table Tb1. In the example illustrated in FIG. 1, the display portion 130 is suspended from the ceiling above the table Tb1. However, the position at which the display portion 130 is provided is not limited to a particular position. In addition, the display portion 130 may typically be a projector capable of projecting a screen onto the top surface of the table Tb1, but it may be other types of display as long as it has a function of displaying a screen.

Moreover, although the case where the top surface of the table Tb1 is the display surface of the screen is mainly described herein, the display surface of the screen may be other than the top surface of the table Tb1. An example of the display surface of the screen may include a wall, a building, a floor surface, a ground surface, a ceiling, or a surface at other place. In addition, in the case where the display portion 130 has its own display surface, the display surface of the screen may be a display surface of the display portion 130.

The speech input portion 120 has a function of inputting speech. In the example illustrated in FIG. 1, the speech input portion 120 includes a total of six microphones, that is, three microphones above the table Tb1 and three microphones present on the upper surface of the table Tb1. However, the number of microphones included in the speech input portion 120 is not limited to the particular number as long as it is one or more. In such a case, the position where one or more microphones included in the speech input portion 120 are provided is also not limited to a particular position. However, if the speech input portion 120 includes a plurality of microphones, the direction of the sound source can be estimated on the basis of the speech that is input to each of the plurality of microphones. In addition, if the speech input portion 120 includes a microphone having directivity, the direction of the sound source can be estimated on the basis of the speech that is input to the directional microphone.

The above description is given as to the configuration example of the information processing system 10 according to an embodiment of the present disclosure.

[1.2. Functional Configuration Example]

Subsequently, a functional configuration example of the information processing system 10 according to an embodiment of the present disclosure is described. FIG. 2 is a block diagram illustrating a functional configuration example of the information processing system 10 according to an embodiment of the present disclosure. As illustrated in FIG. 2, the information processing system 10 according to an embodiment of the present disclosure is configured to include the image input portion 110, the operation input portion 115, the speech input portion 120, the display portion 130, and an information processing device 140 (hereinafter also referred to as "controller 140").

The information processing device 140 controls each component of the information processing system 10. In one example, the information processing device 140 generates information to be output from the display portion 130. In addition, in one example, the information processing device 140 incorporates the information, which is input by each of the image input portion 110, the operation input portion 115, and the speech input portion 120, in the information to be output from the display portion 130. As illustrated in FIG. 2, the information processing device 140 is configured to include an input image acquisition portion 141, an input speech acquisition portion 142, an operation detection portion 143, a speech recognition portion 144, a processing unit acquisition portion 145, a processor 146, and a display controller 147. Details of each of these functional blocks will be described later.

Moreover, the information processing device 140 may be composed of, for example, a central processing unit (CPU). In the case where the information processing device 140 is composed of a processing device such as CPU, this processing device can be composed of an electronic circuit.

The above description is given as to the functional configuration example of the information processing system 10 according to an embodiment of the present disclosure.

[1.3. Overview of Operation]

Figure 3A:
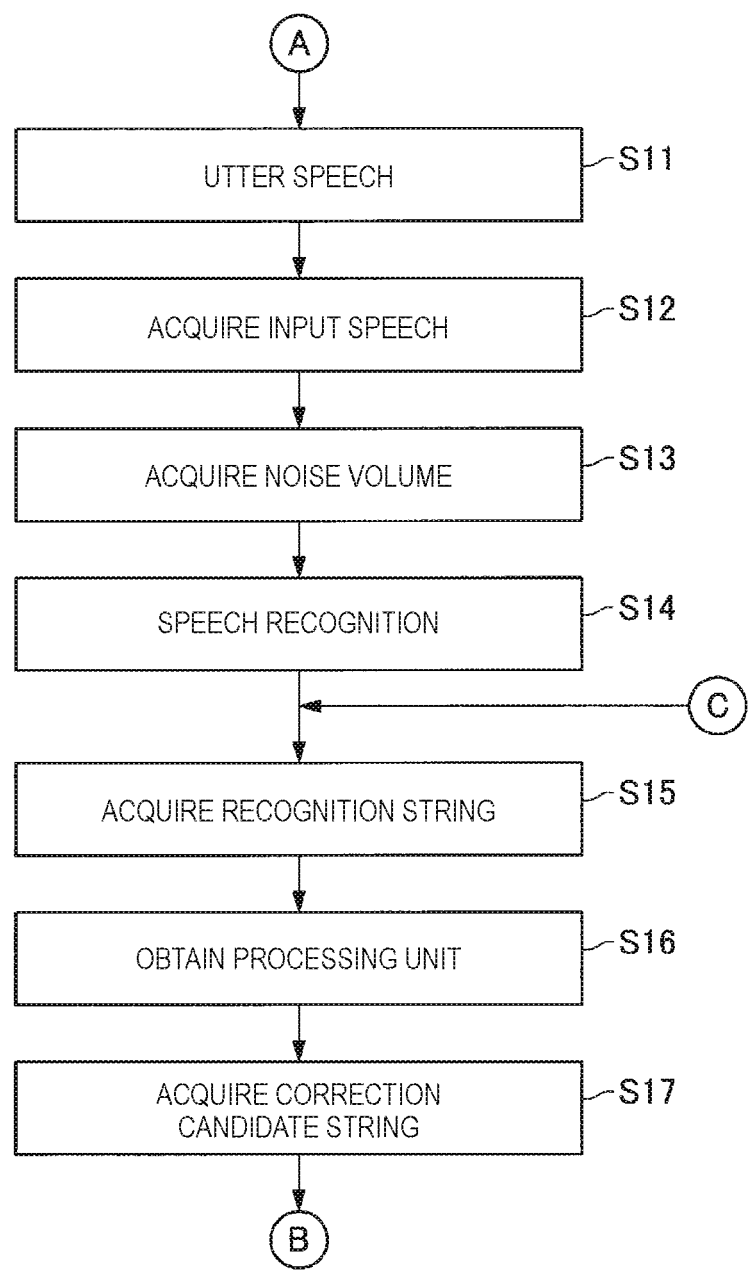
FIG. 3A is a flowchart showing an overview of an operation of an information processing device according to the embodiment.

Subsequently, an overview of the operation of the information processing device 140 according to an embodiment of the present disclosure is described. FIGS. 3A and 3B are flowcharts showing an overview of the operation of the information processing device 140 according to an embodiment of the present disclosure. If the user utters a sound (S11), the input speech acquisition portion 142 acquires speech that is input by the sound input portion 120 as input speech (S12). Then, the speech recognition portion 144 acquires a noise volume from the input speech (S13). Noise may correspond to sound other than speech uttered by the user among the input sounds. Details on acquisition of the noise volume will be described later.

Subsequently, the speech recognition portion 144 performs speech recognition on the input speech (S14) to obtain a string (hereinafter also referred to as "recognition string") from the input speech (S15). The speech recognition technique used by the speech recognition portion 144 is not limited to a particular technique, and speech recognition techniques such as a hidden Markov model may be used. Moreover, in this specification, a string may be composed of one character. Subsequently, the processing unit acquisition portion 145 obtains one or a plurality of processing units from the recognition string on the basis of the noise volume (S16). In one example, the possibility that an error occurs in speech recognition increases as the noise volume increases, and thus the processing unit acquisition portion 145 preferably increases the length of the processing unit per one portion. This makes it possible to reduce the time and effort of causing the user to select the processing unit.

On the other hand, in one example, the possibility that an error occurs in speech recognition decreases as the noise volume decreases, and thus the processing unit acquisition portion 145 preferably reduces the length of the processing unit per one portion. This makes it possible to reduce the time and effort of causing the user to input the speech. In one example, in the case where the language of the recognition string is a language, such as English, French, and German, which is separately written, the processing unit may be a word unit or a combination of a plurality of words. Furthermore, there may be the case where the language of the recognition string is a language, such as Japanese, Chinese, and Korean, which is not separately written. In this case, the processing unit is a morpheme unit obtained by performing morphological analysis on a recognition string, a combination (phrase) unit of independent word and adjunct word, a string unit divided by a predetermined number of characters, or even a sentence unit input as speech.

Furthermore, the processing unit acquisition portion 145 can also acquire one or a plurality of processing units from the recognition string on the basis of the context of the recognition string. In one example, the processing unit acquisition portion 145 refers to dictionary data registered in advance and calculates the ease of connection of a word included in the recognition and the previous and following words. Thus, it is possible to divide combinations of one or more words, which are meaningfully determined as one group, as processing units. Subsequently, the processor 146 acquires a correction candidate string (S17). There are various categories in the type of the correction candidate string as will be described later.

Subsequently, the display controller 147 presents the correction candidate string to the user by causing the display portion 130 to display the correction candidate string (S18). In one case, if a desired recognition string is obtained ("Yes" in S19), the recognition string is decided (S20). In another case, if a desired recognition string fails to be obtained and deletion is selected as the processing type ("No (Deletion)" in S19), the processor 146 deletes the processing target and returns to S18. In the other case, if a desired recognition string fails to be obtained and correction is selected as the processing type ("No (Correction)" in S19), the processor 146 corrects the processing target (S22).

In correcting the processing target, the processor 146 performs a process of adding a new string (S23) or a process of replacing the processing target with a string (S24). In this regard, in the case where the processor 146 performs replacement by speech on the processing target (i.e., replacement by a string recognized from speech), the processor 146 reconstructs the processing unit for a recognition string after the processing target is replaced. Subsequently, in the case where the processor 146 performs correction by speech ("Yes" in S26), the process returns to S11, but in the case where the processor 146 performs correction by others than speech (e.g., correction by a corrected string selected from the correction candidate string) is performed ("No" in S26), the process returns to S15.

The above description is given as to the overview of the operation of the information processing device 140 according to an embodiment of the present disclosure.

[1.4. Screen Configuration Example]

Subsequently, a configuration example of a screen displayed on the display portion 130 by the display controller 147 is described. FIG. 4 is a diagram illustrating a configuration example of a screen displayed on the display portion 130 by the display controller 147. As illustrated in FIG. 4, a screen G10 includes a string display column G11 in which a string is displayed, an all-string deletion operation object G12, a string decision operation object G13, and a speech-based string addition start operation object G14. In addition, as illustrated in FIG. 4, the screen G10 includes an operation object G15 for moving the caret position to the preceding position, an operation object G16 for moving the caret position to the subsequent position, and an operation object G17 for deleting the processing target.

In this regard, as illustrated in FIG. 4, if the operation detection portion 143 detects an operation of selecting the speech-based string addition start operation object G14 and the input voice is acquired by the input speech acquisition portion 142, the speech recognition portion 144 starts speech recognition on the input speech. FIG. 5 is a diagram illustrating an example of a screen displayed in a state in which the user is speaking. In the example illustrated in FIG. 5, the speech-based string addition start operation object G14 is changed to a speech-based string addition end operation object G23.

If the speech recognition by the speech recognition portion 144 is started, the speech recognition portion 144 determines a volume of speech uttered by the user U on the basis of the input speech. In this regard, the way of determining the user speech volume is not limited to a particular way. In one example, the speech recognition portion 144 may estimate a user-uttered speech source direction Du and may determine a volume input from the s user-uttered speech source direction Du as the user speech volume. A way of estimating the user-uttered speech source direction Du is also not limited to a particular way.

In one example, the speech recognition portion 144 may estimate, as the sound source direction of the speech uttered by the user, the direction of arrival of sound input with the volume whose magnitude exceeds a threshold initially by the speech input portion 120. In addition, there may be a plurality of directions of arrival of sound input with a volume having magnitude exceeding the threshold. In this case, the speech recognition portion 144 may estimate, as the sound source direction of the speech uttered by the user, one arrival direction that matches, or is similar to, the direction of the finger of the user (e.g., the direction from the fingertip to the root of the finger) who performs the operation of selecting the speech-based string addition start operation object G14 among a plurality of arrival directions. The range of similarity may be determined in advance. In addition, the finger direction may be obtained by analyzing the input image.

Furthermore, in one example, the speech recognition portion 144 may estimate, as the user-uttered speech source direction Du, the arrival direction of the speech input with the highest volume by the speech input portion 120. Alternatively, the speech recognition portion 144 may estimate, as the user-uttered speech source direction Du, one arrival direction that matches, or is similar to, the direction of the finger of the user who performs the operation of selecting the string addition start operation object G14. In this case, the speech recognition portion 144 may determine, as noise, the speech that is input to the speech input portion 120 from a direction other than the user-uttered speech source direction, and may determine, a noise volume, the volume input to the speech input portion 120 from a direction other than the sound source direction Du.

In the case where the user-uttered speech volume exceeds the volume at which speech can be recognized (hereinafter also referred to as "recognizable volume"), the display controller 147 may cause the display portion 130 to display a first motion object Mu that moves toward the string addition end operation object G23. This makes it possible for the user to know whether the utterance is made with the volume at which speech can be recognized. In addition, the display controller 147 may cause the display portion 130 to display the first motion object Mu on the basis of the user-uttered speech source direction Du. This makes it possible for the user to know reliably whether the user's own speech volume exceeds the volume at which speech can be recognized.

Specifically, the display controller 147 may move the first motion object Mu toward the string addition end operation object G23 in the direction opposite to the user-uttered speech source direction Du. Although the example illustrated in FIG. 5 assumes that circular objects appearing one after another near the user move in the direction opposite to the user-uttered speech source direction Du and they disappear upon arrival at the string addition termination operation object G23, the movement of the first motion object Mu is not limited to this example. Furthermore, the destination of movement of the first movement object Mu may include, but not limited to the string addition end operation object G23, any object that is displayed.

[1.5. Determination of Processing Unit]

In this manner, the recognition string is obtained by performing speech recognition on the input speech, but an error is also likely to occur in speech recognition for the input speech. FIG. 6 is a diagram illustrating an example of a string that the user wishes to enter and an example of a recognition string obtained by speech recognition. Referring to FIG. 6, "I drive your car to airports" is displayed as an example of a string that the user wishes to enter, and "I drove your car to airports" is displayed as an example of a string obtained by speech recognition. Thus, it is preferable that some processing can be performed for the string obtained by speech recognition.

Figure 7:
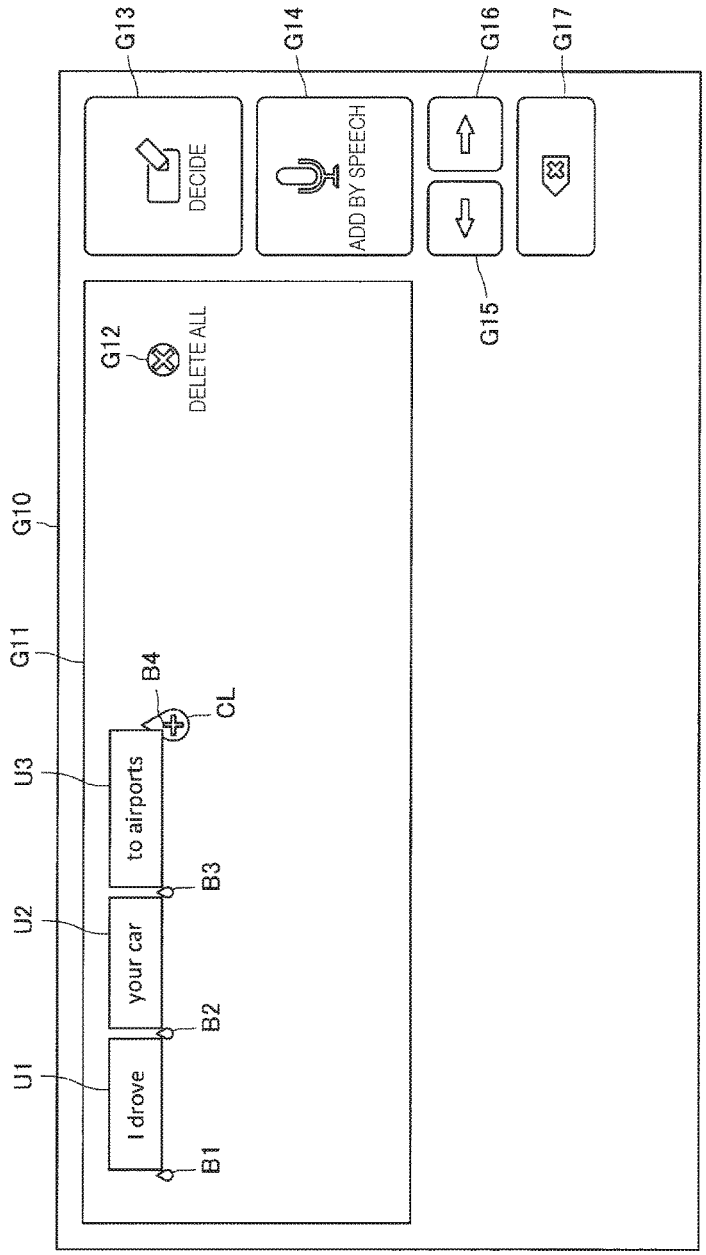
FIG. 7 is a diagram illustrating an example of a screen on which a recognition string is displayed.

FIG. 7 is a diagram illustrating an example of a screen on which a recognition string is displayed. As illustrated in FIG. 7, the display controller 147 can cause the display portion 130 to display a recognition string "I drove your car to airports". In this case, the processing unit acquisition portion 145 acquires a processing unit U1 "I drove", a processing unit U2 "your car", and a processing unit U3 "to airports" from the recognition string "I drove your car to airports". Thus, the display controller 147 can cause the display portion 130 to display these processing units U1 to U3. By doing so, the processor 146 causes the user to select one of the processing units U1 to U3, and can process the processing target selected by the user.

Moreover, as illustrated in FIG. 7, the display controller 147 can cause a caret position selection object B1 to be displayed at a position preceding the processing unit U1, and a caret position selection object B2 to be displayed between the processing unit U1 and the processing unit U2. In addition, the display controller 147 can cause a caret position selection object B3 to be displayed between the processing unit U2 and the processing unit U3, and a caret position selection object B4 to be displayed at a position preceding the processing unit U4. Then, the display controller 147 can arrange a caret CL in one of the caret position selection objects B1 to B4.

FIG. 7 illustrates the example in which the processing unit U1 "I drove", the processing unit U2 "your car", and the processing unit U3 "to airports" from the recognition string "I drove your car to airports" by the processing unit acquisition portion 145. However, the possibility that an error occurs in speech recognition with respect to input speech can vary depending on noise, so processing on the string recognized from input speech becomes more efficient by changing the number of processing units. Thus, the processing unit acquisition portion 145 may acquire one or a plurality of processing units from the recognition string "I drove your car to airports" on the basis of noise. More specifically, the processing unit acquisition portion 145 may acquire one or a plurality of processing units from the recognition string "I drove your car to airports" on the basis of a noise volume.

FIG. 8 is a diagram illustrated to describe an example of acquiring one or a plurality of processing units from the recognition string "I drove your car to airports" on the basis of the noise volume. As described above, as the noise volume increases, the possibility that an error occurs in speech recognition increases, so the processing unit acquisition portion 145 preferably decreases the number of processing units as shown in "large noise volume" in FIG. 8. This makes it possible to reduce the time and effort of causing the user to select the processing unit. On the other hand, as the noise volume decreases, the possibility that an error occurs in speech recognition decreases, so the processing unit acquisition portion 145 preferably increase the number of processing units as shown in "small noise volume" in FIG. 8. This makes it possible to reduce the time and effort of causing the user to input the speech.

Figure 9:
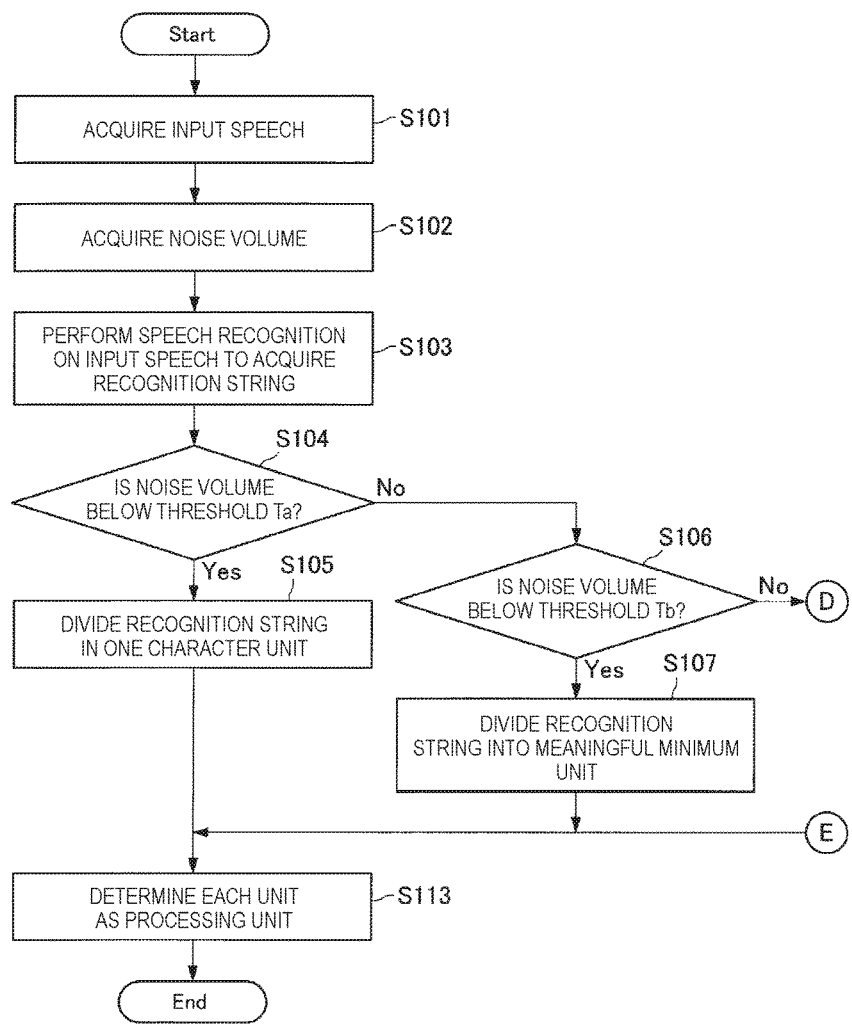
FIG. 9 is a flowchart showing an example of a processing unit determination operation.
Figure 10:
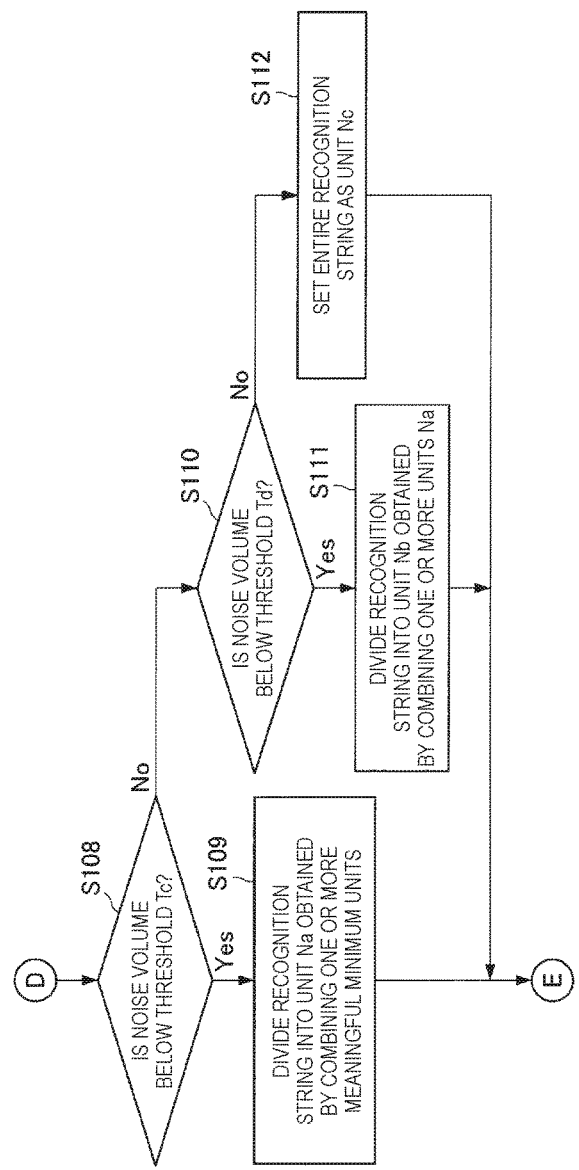
FIG. 10 is a flowchart showing an example of a processing unit determination operation.

Subsequently, the operation of determining the processing unit is described. FIGS. 9 and 10 are flowcharts showing an example of a processing unit determination operation. Moreover, these flowcharts merely show an example of the processing unit determination operation, so this processing unit determination operation is not limited to the example shown in these flowcharts. The input speech acquisition portion 142 acquires input speech (S101). Next, the speech recognition portion 144 acquires a noise volume from the input speech (S102). Then, the speech recognition portion 144 performs speech recognition on the input speech to acquire a recognition string (S103).

Subsequently, if the noise volume is below a threshold Ta ("Yes" in S104), the processing unit acquisition portion 145 divides the recognition string in units of one character (S105) and proceeds to S113. On the other hand, if the noise volume exceeds the threshold Ta ("No" in S104), the processing unit acquisition portion 145 proceeds to S106. Subsequently, if the noise volume is below a threshold Tb ("Yes" in S106), the processing unit acquisition portion 145 divides the recognition string into a meaningful minimum unit (S107) and proceeds to S113. On the other hand, if the noise volume exceeds the threshold Tb ("No" in S 106), the processing unit acquisition portion 145 proceeds to S108.

Subsequently, if the noise volume is below a threshold Tc ("Yes" in S 108), the processing unit acquisition portion 145 divides the recognition string into a unit Na obtained by combining one or more meaningful minimum units (S109), and proceeds to S113. On the other hand, if the noise volume exceeds the threshold Tc ("No" in S108), the processing unit acquisition portion 145 proceeds to S110. Subsequently, if the noise volume is below a threshold Td ("Yes" in S110), the processing unit acquisition portion 145 divides the recognition string into a unit Nb obtained by combining one or more units Na (S111), and proceeds to S113. On the other hand, if the noise volume exceeds the threshold Tb ("No" in S110), the processing unit acquisition portion 145 sets the entire recognition string as a unit Nc (S112), and proceeds to S113.

Subsequently, as described above, the processing unit acquisition portion 145 determines each unit generated from the recognition string as a processing unit (S113). Moreover, in the above description, in the case where the threshold is equal to the noise volume, the processing unit acquisition portion 145 may shift the operation to any one of the processing branches. As described above, the processing unit acquisition portion 145 acquires one or a plurality of processing units from the recognition string on the basis of the noise volume. When one or more processing units are selected as the processing target, the processor 146 can process the selected processing target. This configuration allows the processing on the recognition string to be performed more efficiently.

[1.6. Presentation of String]

As described above, the display controller 147 causes the display portion 130 to display the processing units U1 to U3, and when any one of the processing units U1 to U3 is selected as the processing target, the processor 146 can process the selected processing target. In one example, there may be a case where the operation detection portion 143 detects an operation of selecting a speech-based replacement operation object G25 (see FIG. 18) and the input speech acquisition portion 142 acquires re-input speech. In this case, the processor 146 can correct the processing target by replacing the processing target with a recognition string obtained by performing the speech recognition on the re-input speech.

In this case, as the noise volume increases, the possibility that errors occur in speech recognition on the re-input speech increases, so the processing unit acquisition portion 145 preferably increases the success rate of speech recognition. In this regard, as the re-input speech is longer, the possibility that the speech recognition on the re-input speech succeeds increases. Thus, it is preferable that the processing unit acquisition portion 145 increases the length of the processing unit as the noise volume is larger (it is preferable to decrease the number of processing units as the noise volume is larger). On the other hand, as the re-input speech is longer, it takes more time and effort to re-input the speech. Thus, it is preferable that the processing unit acquisition portion 145 reduces the length of the processing unit as the noise volume is smaller (it is preferable to increase the number of processing units as the noise volume is smaller).

However, even if, by using speech recognition, it is attempted to correct a processing target in which an error occurs in speech recognition, the correction may be failed depending on a habit of the user's speech, the environment in which the user utters a speech, the performance of a speech recognition engine, or the like. Thus, when the user selects a correction string from one or a plurality of correction candidate strings, the processor 146 may correct the processing target by replacing the processing target with the correction string. More specifically, the display controller 147 preferably causes the display portion 130 to display one or a plurality of correction candidate strings for each category. This makes it possible for the user to search each category for one or a plurality of correction candidate strings.

A database for providing the correction candidate string to the user for each category is now described. FIGS. 11 to 17 are diagrams illustrating examples of databases for providing correction candidate strings to users for each category. In particular, FIG. 11 is a diagram illustrating an example of a predictive conversion category database. In one example, a collocation or the like predicted from dictionary data or the like on the basis of a morpheme or a word belongs to the predictive conversion category. FIG. 12 is a diagram illustrating an example of a Phrase category database. In one example, in the case where English is entered, a string obtained by adding a preposition to an entered word, an idiom including the entered word, or the like belongs to the Phrase category. In addition, in one example, in the case where Japanese is entered, a string or the like in which a postpositional particle is added to a morpheme obtained by morphological analysis belongs to the Phrase category.

FIG. 13 is a diagram illustrating an example of an original form category database. In one example, in the case where English is entered, a singular form of a noun with respect to plural form of the noun belongs to the original form category, and the prototype of a verb with respect to the past form of the verb belongs to the original form category. In addition, in one example, in the case where Japanese is entered, for example, reading (hiragana or katakana) corresponding to the morpheme obtained by morphological analysis belongs to the original form category.

FIG. 14 is a diagram illustrating an example of a previous correction result category database. In one example, a result of correction performed previously with respect to the same word as the entered word belongs to the previous correction result category. FIG. 15 is a diagram illustrating an example of a similar sound category database. FIG. 16 is a diagram illustrating an example of the similar semantic category database. FIG. 17 is a diagram illustrating an example of a conversion form category database. In one example, in the case where English is entered, the plural form, the current progressive form, the past form, the derivative adjective, the derivative adverb, the comparative degree, the superlative degree, or the like belongs to the conversion form category, with respect to the prototype of a word. In addition, in one example, in the case where Japanese is entered, other Chinese character candidates and the like belong to the conversion form category.

Figure 18:
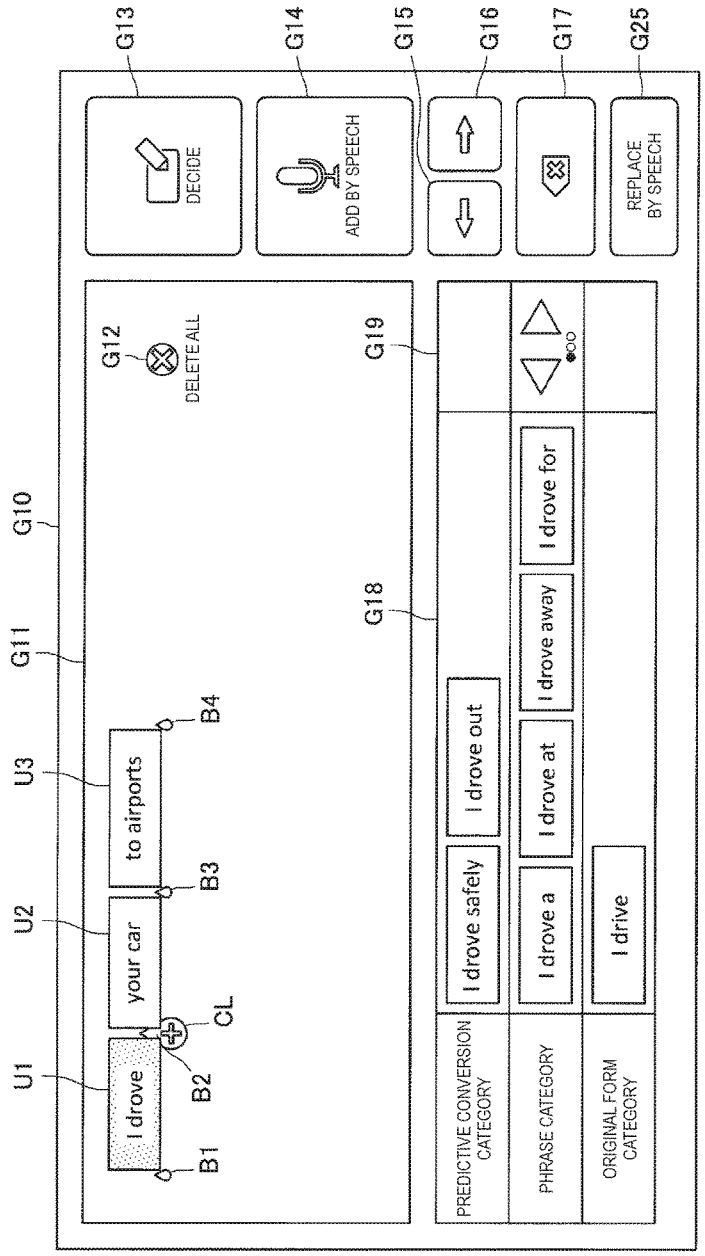
FIG. 18 is a diagram illustrating an example of a correction candidate string displayed for each category.

FIG. 18 is a diagram illustrating an example of a correction candidate string displayed for each category. As illustrated in FIG. 18, a case where the user performs an operation of selecting the processing unit U1 "I drove" as a processing target to correct the processing unit U1 "I drove" among the processing units U1 to U3 to read "I drive" is assumed. In such a case, the display controller 147 acquires a correction candidate string corresponding to the processing unit U1 "I drove" from each database and displays it in a string display column G18. The correction candidate string belonging to each of the predictive conversion category, the Phrase category, and the original category is displayed in the string display column G18 shown in FIG. 18 as a correction candidate string corresponding to the processing unit U1 "I drove".

Then, in the case where the operation of selecting any one of the correction candidate strings displayed in this manner is input, the processor 146 may replace the processing target "I drove" with the selected correction candidate string. In one example, in the case where an operation of selecting the correction candidate string "I drive" displayed in the original form category is input, the processor 146 may replace the processing target "I drove" with the selected correction candidate string "I drive". Moreover, the display controller 147, on the basis of the operation of selecting a scroll operation object G19 in a category in which none of the correction candidate strings are fit in the string display column G18, can display the correction candidate strings belonging to the category by scrolling.

Figure 19:
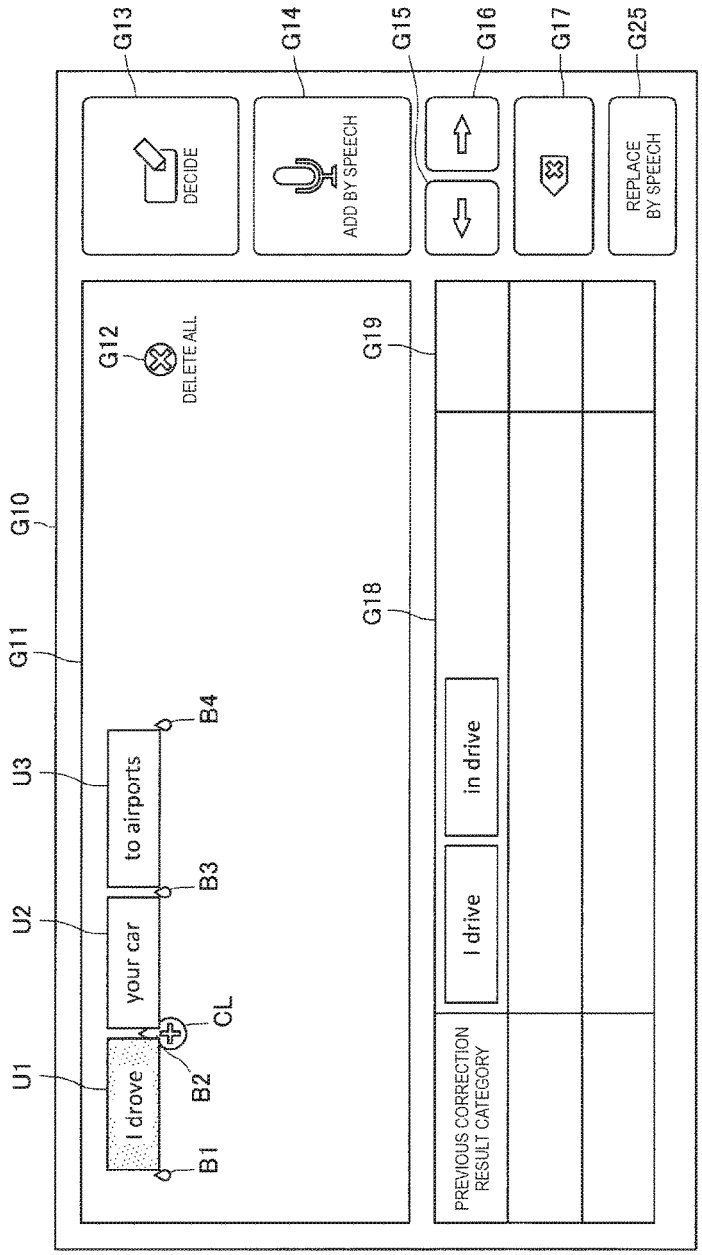
FIG. 19 is a diagram illustrating another example of a correction candidate string displayed for each category.

Furthermore, the display controller 147 can display the category displayed in the string display column G18 by scrolling on the basis of a predetermined operation. FIG. 19 is a diagram illustrating another example of the correction candidate string displayed for each category. Referring to FIG. 19, the categories displayed in the string display column G18 are scrolled, and thus the correction candidate string belonging to the previous correction result category is displayed in the string display column G18. In one example, when an operation of selecting the correction candidate string "I drive" displayed in the previous correction result category is input, the processor 146 may replace the process target "I drove" with the selected correction candidate string "I drive".

Figure 20:
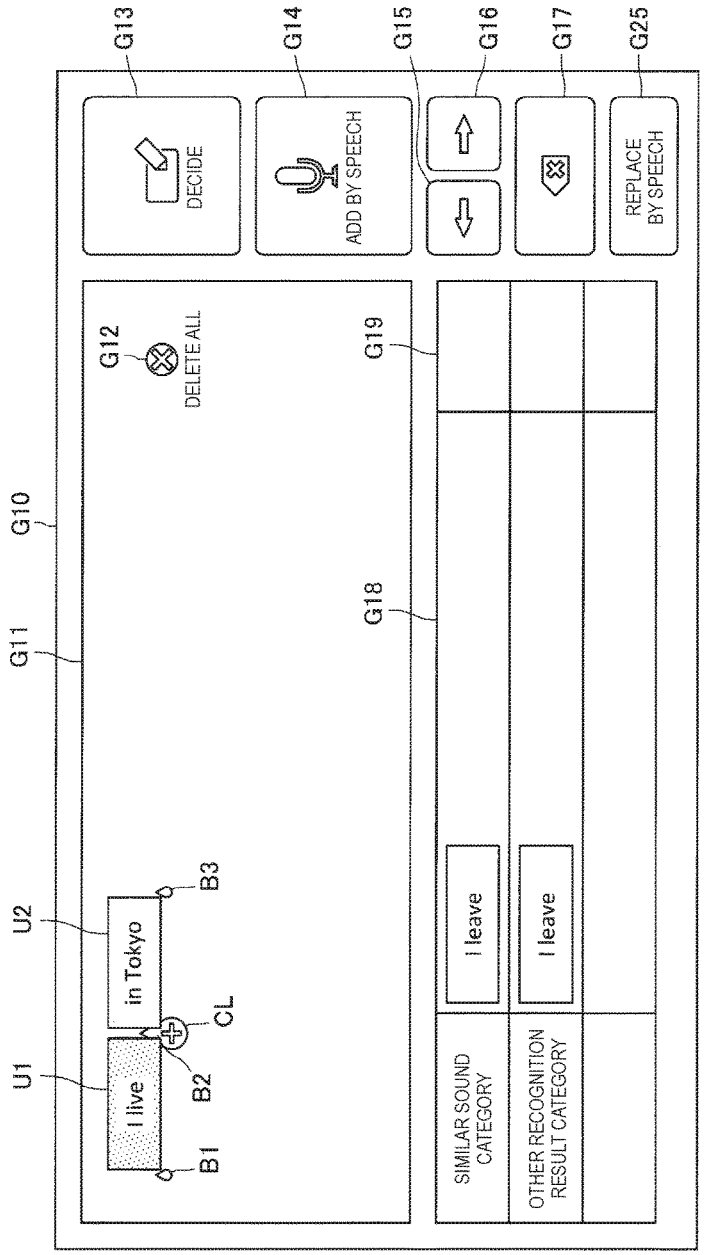
FIG. 20 is a diagram illustrating another example of a correction candidate string displayed for each category.

In the above description, the case of acquiring the recognition string "I drove your car to airports" is assumed. Subsequently, the case of obtaining a recognition string "I live in Tokyo" is assumed. FIG. 20 is a diagram illustrating another example of the correction candidate string displayed for each category. As illustrated in FIG. 20, the case where the processing unit acquisition portion 145 acquires a processing unit U1 "I live" and a processing unit U2 "in Tokyo" from the recognition string "I live in Tokyo" is assumed. In this case, as illustrated in FIG. 20, the display controller 147 can cause the display portion 130 to display these processing units U1 and U2.

In this regard, the case where the user performs an operation of selecting the processing unit U1 "I live" as a processing target to correct the processing unit U1 "I live" of the processing units U1 and U2 to read "I leave" is assumed. In such a case, the display controller 147 acquires a correction candidate string corresponding to the processing unit U1 "I live" from each database and displays it in the string display column G18. The correction candidate string belonging to each of the similar sound category and the other recognition result category is displayed in the string display column G18 shown in FIG. 20 as the correction candidate string corresponding to the processing unit U1 "I live".

Then, in the case where the operation of selecting any one of the correction candidate strings displayed in this manner is input, the processor 146 may replace the processing target "I live" with the selected correction candidate string. In one example, in the case where an operation of selecting the correction candidate string "I leave" displayed in the similar sound category is input, the processor 146 may replace the processing target "I live" with the selected correction candidate string "I leave".

Figure 21:
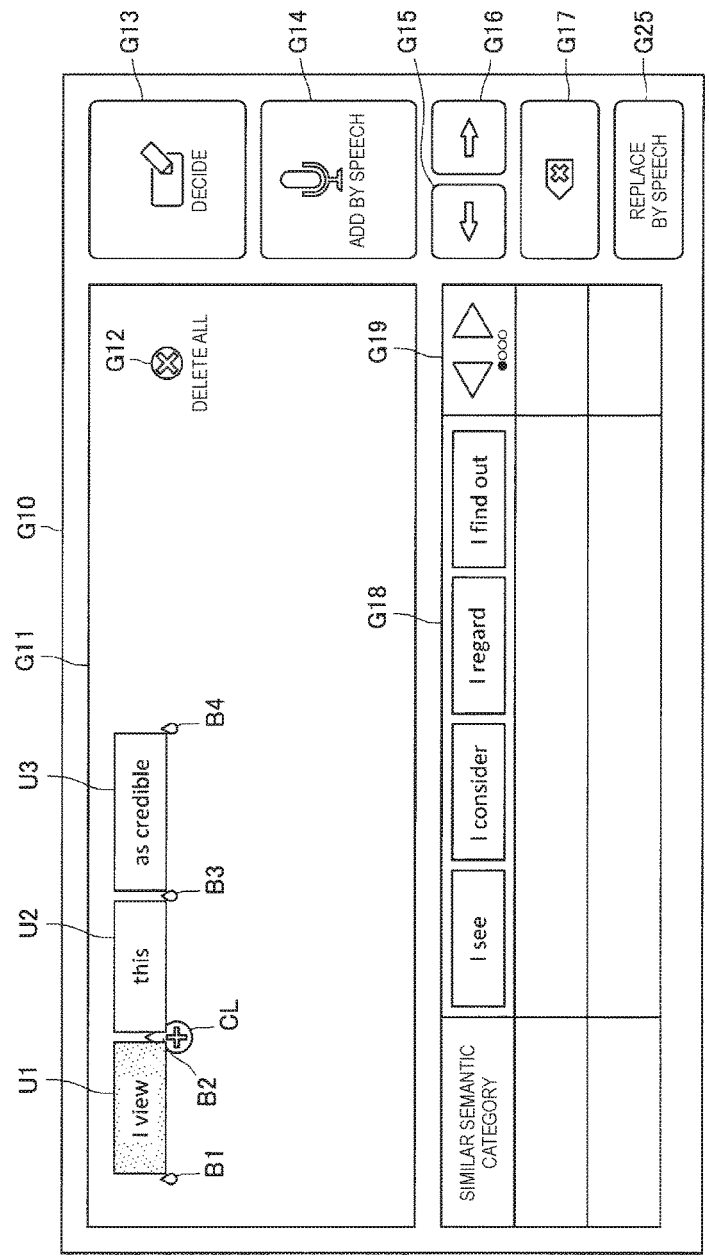
FIG. 21 is a diagram illustrating another example of a correction candidate string displayed for each category.

The above description assumes the case of acquiring the recognition string "I live in Tokyo". Subsequently, the case of acquiring a recognition string "I view this as credible" is assumed. FIG. 21 is a diagram illustrating another example of the correction candidate string displayed for each category. As illustrated in FIG. 21, the case where the processing unit acquisition portion 145 acquires a processing unit U1 "I view", a processing unit U2 "this", and a processing unit U3 "as credible" from the recognition string "I view this as credible" is assumed. In this case, as illustrated in FIG. 21, the display controller 147 can cause the display portion 130 to display these processing units U1 to U3.

In this regard, the case where the user performs an operation of selecting the processing unit U1 "I view" as the processing target to correct the processing unit U1 "I view" of the processing units U1 and U2 is assumed. In such a case, the display controller 147 acquires a correction candidate string corresponding to the processing unit U1 "I view" from each database and displays it in the string display column G18. The correction candidate string belonging to the similar semantic category is displayed in the string display column G18 shown in FIG. 21 as the correction candidate string corresponding to the processing unit U1 "I view".

Then, in the case where the operation of selecting any one of the correction candidate strings displayed in this manner is input, the processor 146 may replace the processing target "I view" with the selected correction candidate string. In one example, in the case where an operation of selecting a correction candidate string "I consider" displayed in the similar semantic category is input, the processor 146 may replace the processing target "I live" with the selected correction candidate string "I consider".

Figure 22:
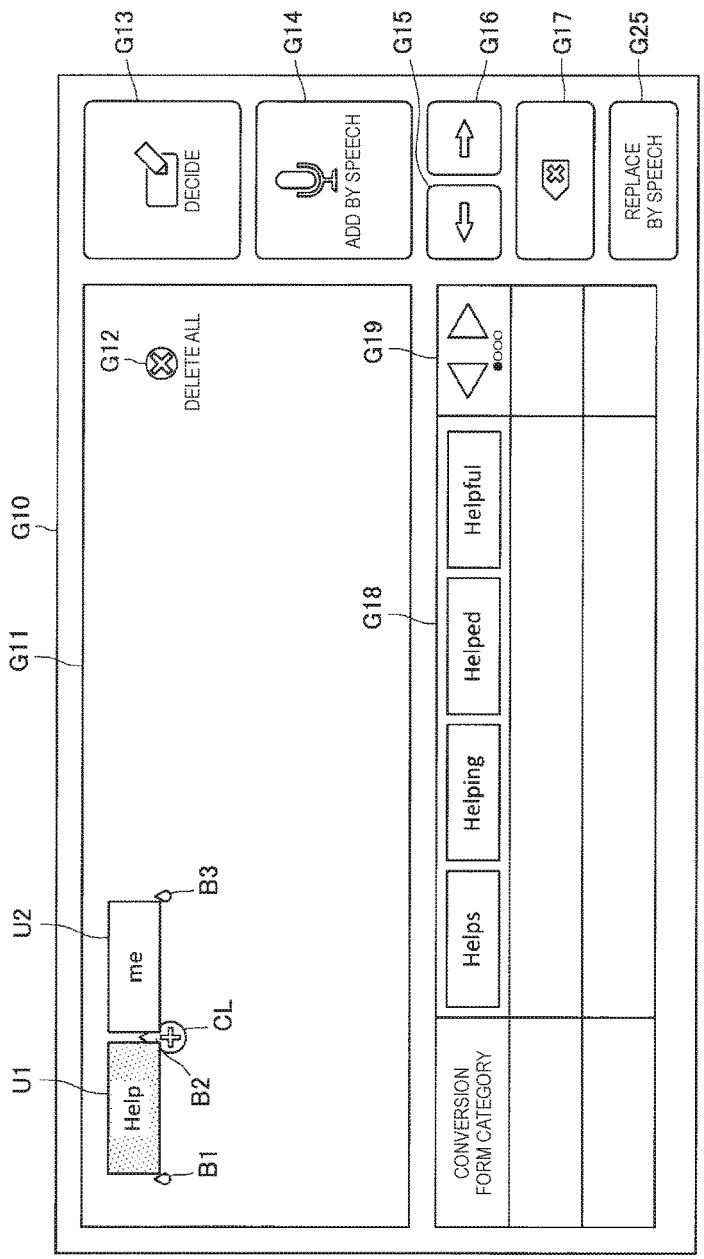
FIG. 22 is a diagram illustrating another example of a correction candidate string displayed for each category.

The above description assumes the case of acquiring the recognition string "I view this as credible". Subsequently, the case of acquiring a recognition string "Help me" is assumed. FIG. 22 is a diagram illustrating another example of the correction candidate string displayed for each category. As illustrated in FIG. 22, the case where the processing unit acquisition portion 145 acquires a processing unit U1 "Help" and a processing unit U2 "me" from the recognition string "Help me" is assumed. In this case, as illustrated in FIG. 22, the display controller 147 can cause the display portion 130 to display these processing units U1 and U2.

In this regard, the case where the user performs an operation of selecting the processing unit U1 "Help" as a processing target is assumed. In such a case, the display controller 147 acquires a correction candidate string corresponding to the processing unit U1 "Help" from each database and displays it in the string display column G18. The correction candidate string belonging to the conversion form category is displayed in the string display column G18 shown in FIG. 22 as a correction candidate string corresponding to the processing unit U1 "Help".

Then, in the case where the operation of selecting any one of the correction candidate strings displayed in this manner is input, the processor 146 may replace the processing target "Help" with the selected correction candidate string. However, when the user reconsiders that correction on the recognition string "Help me" is not particularly necessary to be performed, the user may perform an operation of selecting a string decision operation object G13. In the case where the operation of selecting the string decision operation object G13 is detected, the processor 146 may decide the recognition string "Help me".

Although the example of the correction candidate string has been described, an additional candidate string may be presented to the user. The additional candidate string may be a single character such as a symbol, a numeral, and an alphabet, or may be an emoticon formed by a combination thereof. Such symbol, numeral, and alphabet characters or an emoticon may fail to be entered depending on the performance of the speech recognition engine, or may be difficult to be entered depending on types of the speech recognition engine. Thus, displaying such symbol, numeral, and alphabet characters or an emoticon as an additional candidate character string is useful for the user.

As a specific process, in the case where the user selects an additional string from one or a plurality of additional candidate strings, the processor 146 may add the additional string to the recognition string. The additional string may be added to the position where the caret CL is present. In this case, the display controller 147 may preferably cause the display portion 130 to display one or a plurality of additional candidate strings for each category. This makes it possible for the user to search each category for one or a plurality of correction candidate strings.

Subsequently, a database used to provide the user with an additional candidate string such as symbol, numeral, and alphabet characters or an emoticon for each category is described. FIGS. 23 to 26 are diagrams illustrating an example of a database used to provide the user with the additional candidate string for each category. In particular, FIG. 23 is a diagram illustrating an example of a symbol category database. FIG. 24 is a diagram illustrating an example of a numeral category database. FIG. 25 is a diagram illustrating an example of an alphabet category database. FIG. 26 is a diagram illustrating an example of an emoticon category database.

Figure 27:
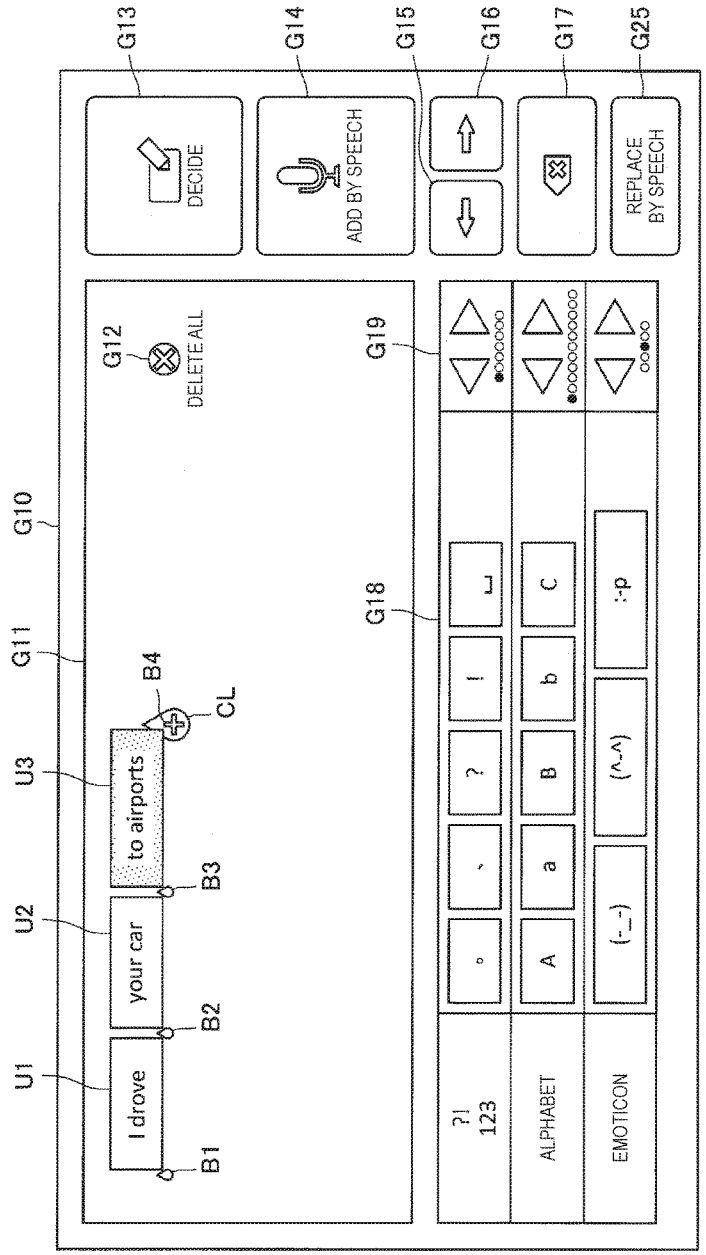
FIG. 27 is a diagram illustrating another example of an additional candidate string displayed for each category.

FIG. 27 is a diagram illustrating another example of the additional candidate string displayed for each category. As illustrated in FIG. 27, the case where the user performs an operation of selecting the caret position selection object B4 as an additional position to add an emoticon to the caret position selection object B4. In such a case, the display controller 147 acquires the additional candidate string from each database and displays it in the string display column G18. An additional candidate string belonging to each of the numeral, alphabet, and emoticon categories is displayed in the string display column G18 shown in FIG. 27 as the additional candidate string.

Then, in the case where the operation of selecting any one of the additional candidate strings displayed in this manner is input, the processor 146 may add the selected additional candidate string to the position of the caret position selection object B4. In one example, in the case where an operation for selecting an additional candidate string "(-_-)" displayed in the emoticon category is input, the processor 146 may add the selected additional candidate string "(-_-)" to the caret position selection object B4. Moreover, the display controller 147, on the basis of the operation of selecting a scroll operation object G19 in a category in which none of the additional candidate strings are fit in the string display column G18, can display the additional candidate strings belonging to the category by scrolling.

Figure 28:
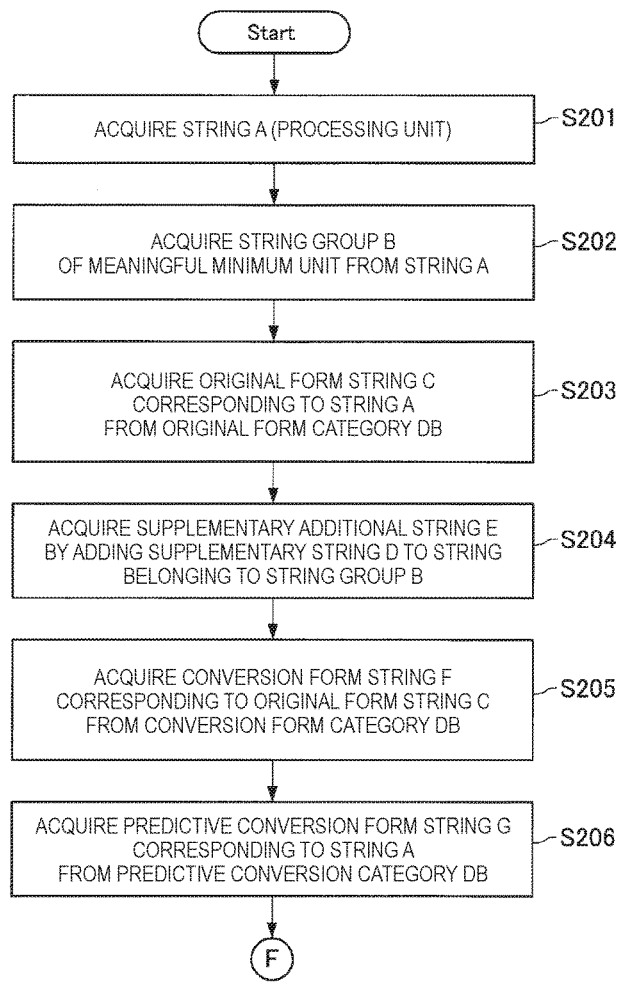
FIG. 28 is a flowchart showing an example of a correction candidate string acquisition operation.
Figure 29:
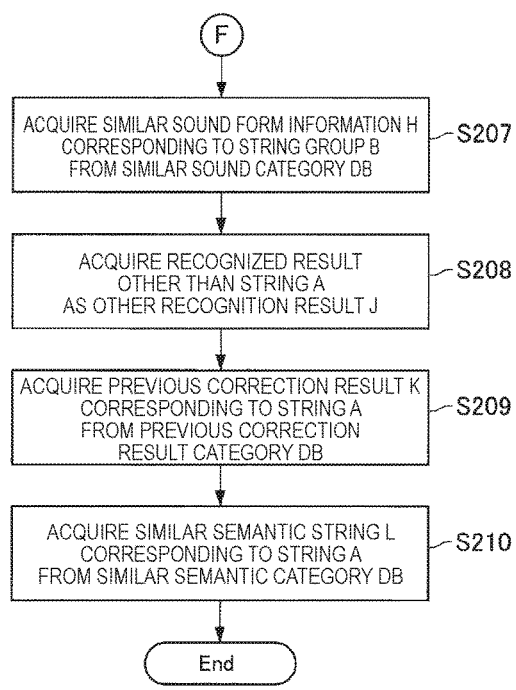
FIG. 29 is a flowchart showing an example of a correction candidate string acquisition operation.

Subsequently, an operation of acquiring a correction candidate string is described. FIGS. 28 and 29 are flowcharts showing an example of the operation of acquiring the correction candidate string. Moreover, this flowchart merely shows an example of the operation of acquiring the correction candidate string, so the operation of acquiring the correction candidate string is not limited to the example shown in this flowchart. The processor 146 acquires a string A (processing unit) (S201), and acquires a string group B of a meaningful minimum unit from the string A. Subsequently, the processor 146 acquires an original form string C corresponding to the string A from the original form category database (S203).

Subsequently, the processor 146 acquires a supplementary additional string E by adding a supplementary string D to a string belonging to the string group B (S204). In the case where the string group B is English, an example of the supplementary string D includes a preposition. In addition, in the case where the string group B is Japanese, an example of the supplementary string D includes a postpositional particle. Subsequently, the processor 146 acquires a conversion form string F corresponding to the original form string C from the conversion form category database (S205). Subsequently, the processor 146 acquires a predictive conversion form string G corresponding to the string A from the predictive conversion category database (S206).

Subsequently, the processor 146 acquires similar sound form information H corresponding to the string group B from the similar sound category database (S207). Subsequently, the processor 146 acquires a recognized result other than the string A as the other recognition result J (S208). Subsequently, the processor 146 acquires a previous correction result K corresponding to the string A from the previous correction result category database (S209). Subsequently, the processor 146 acquires a similar semantic string L corresponding to the string A from the similar semantic category database (S210).

The string acquired as described above (e.g., the original form string C, supplementary additional string E, conversion form string F, predictive conversion form string G, similar sound form information H, previous correction result K, other recognition result J, previous correction result K, and similar semantic string L) can be displayed on the display portion 130 as a correction candidate string. Moreover, the order in which the respective strings are acquired is not limited to that shown in the flowcharts of FIGS. 28 and 29.

[1.7. Control of Length of Processing Target]

As described above, the processing target can be corrected by performing speech recognition on the re-input speech. However, in the case of correcting the processing target by performing speech recognition on the re-input speech, correcting the lengthened processing target can improve the correction success rate. Thus, in the case of deciding to correct the processing target by the re-input speech, the processor 146 may control the length of the processing target. In one example, in the case of deciding to correct the processing target by the re-input speech, the processor 146 may make the processing target longer.

Figure 30:
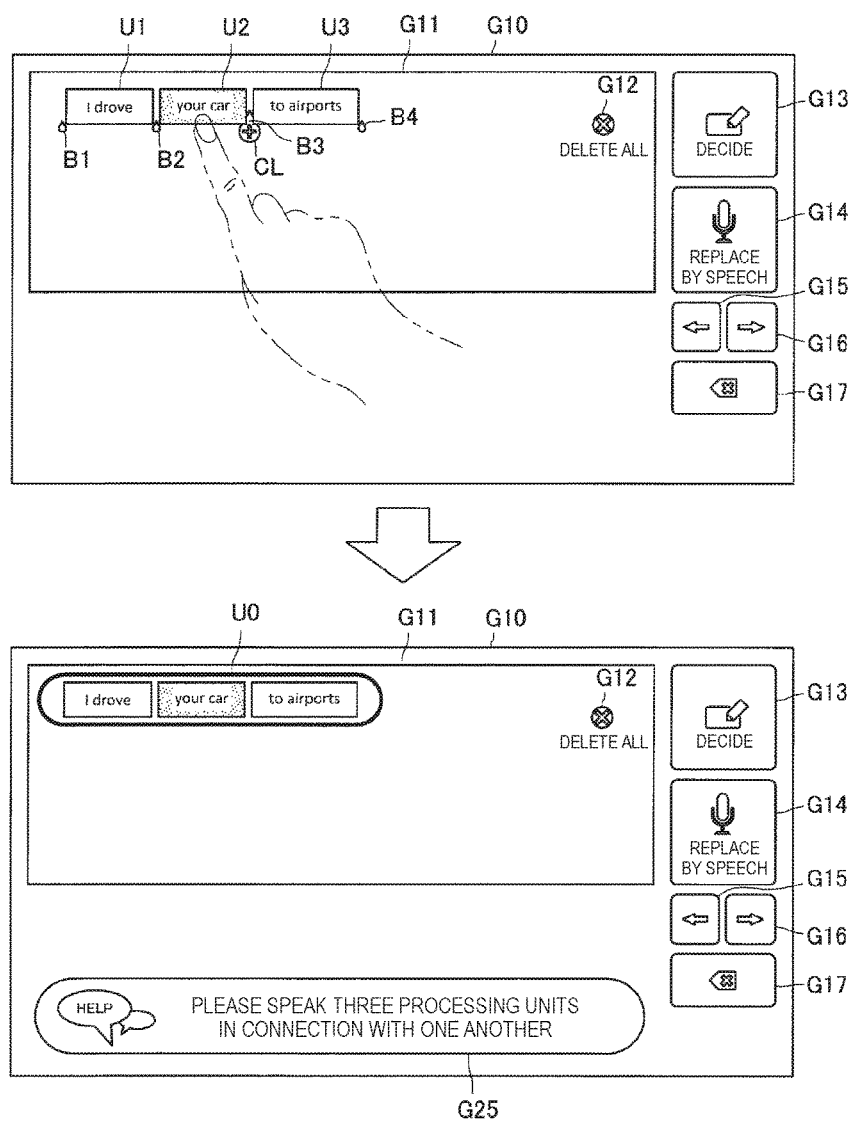
FIG. 30 is a diagram illustrated to describe an example of controlling the length of a processing target.

FIG. 30 is a diagram illustrated to describe an example of controlling the length of a processing target. Referring to FIG. 30, the processing unit acquisition portion 145 acquires a processing unit U1 "I drove", a processing unit U2 "your car", and a processing unit U3 "to airports" from the recognition string "I drove your car to airports", and the display controller 147 causes the display portion 130 to display these processing units U1 to U3. In this regard, there may be a case where an operation of selecting a speech-based replacement operation object G24 is performed and the processing unit U2 is selected as a processing target, as illustrated in FIG. 30. In this case, the processor 146 may set, as a processing target, a new processing target including the processing unit U2 and the processing units U1 and U3 preceding and following the processing unit U2.

Moreover, the above description is given as to the example in which, in the case of deciding to correct the processing target by the re-input speech, the processing target is made longer by the processor 146 to include adjacent processing units preceding and following the processing target. However, there is no particular limitation on how long the processing object is made. In addition, the display controller 147 may control the length of the processing target and then may cause the display portion 130 to display a message that prompts a speech input depending on the length of the controlled processing target, thereby allowing the user to know the length of the processing target. In the example illustrated in FIG. 30, the processing target is extended to three processing units U1 to U3, so the display controller 147 causes a message "Please speak three processing units in connection with one another" to be displayed.

Furthermore, the possibility that an error occurs in speech recognition performed on the re-input speech may vary with the noise volume. Thus, in the case of deciding to correct the processing target by the re-input speech, the processor 146 may control the length of the processing target on the basis of the noise volume. More specifically, it is considered that the possibility that an error occurs in speech recognition for the re-input speech increases as the noise volume increases. Thus, in the case of deciding to correct the processing target by speech, the processor 146 may make the processing target longer as the noise volume increases.

Furthermore, in the case of deciding to correct the processing target by speech, the processor 146 may determine whether to include a word in the processing target depending on the part of speech in determining whether to include a word in the processing target in the order of proximity to the processing target. In one example, it is typically considered that a plurality of nouns are to be processed separately, not simultaneously, and thus the display controller 147 may allow up to a word before the second noun to be included in the processing target but the second noun not to be included in the processing target.

Figure 31:
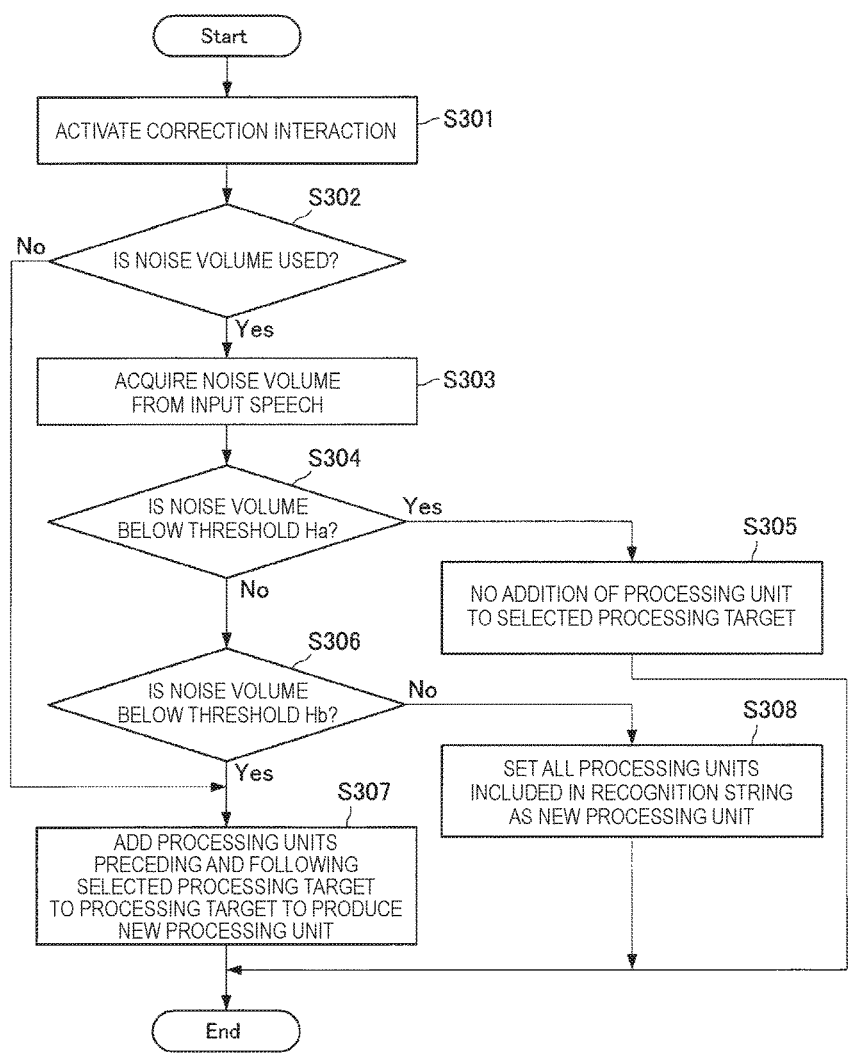
FIG. 31 is a flowchart showing an example of an operation of controlling the length of a processing target.

Subsequently, the operation of controlling the length of the processing target is described. FIG. 31 is a flowchart showing an example of the operation of controlling the length of the processing target. Moreover, this flowchart merely shows an example of the operation of controlling the length of the processing target, so the operation of controlling the length of the processing target length is not limited to the example shown in this flowchart. The processor 146 activates correction interaction in association with selection of the processing target (S301). If the noise volume is not used ("No" in S302), the processor 146 shifts the operation to S307.

On the other hand, if the noise volume is used ("Yes" in S303), the speech recognition portion 144 acquires the noise volume from the input speech (S303). If the noise volume is below a threshold Ha ("Yes" in S304), the processor 146 terminates the operation without adding a processing unit to the selected processing target (S305). On the other hand, if the noise volume exceeds the threshold Ha ("No" in S304), the processor 146 shifts the operation to S306.

Subsequently, if the noise volume exceeds a threshold Hb ("No" in S306), the processor 146 sets all the processing units included in the recognition string as one new processing unit (S308) and terminates the operation. On the other hand, if the noise volume is below the threshold Hb ("Yes" in S306), the processor 146 adds processing targets preceding and following the selected processing target to the processing target to produce one new processing unit (S307), and terminates the operation.

[1.8. Change in the Number of Processing Units]

The above description is given as to an example in which the processing unit is increased in length as the noise volume increases (an example in which the number of processing units is made smaller as the noise volume increases). However, there may be a case where a string having no error in speech recognition is included in one processing unit more than the assumption of the user. Thus, in the case where a predetermined change operation is input, the processing unit acquisition portion 145 may change the number of processing units to be included in at least one of one or a plurality of processing units. In one example, the processing unit acquisition portion 145 may determine a processing unit to be divided and a division position of the processing unit on the basis of the position at which a predetermined change operation is performed, and may divide the processing units to be divided at the division position.

FIG. 32 is a diagram illustrated to describe an example of changing the number of processing units. Referring to FIG. 32, an example in which a processing unit U0 "I drove your car to airports every day" is obtained by the processing unit acquisition portion 145 is illustrated. In such a situation, if the user wants to divide the processing unit U0 "I drove your car to airports every day" into "I drove your car" and "to airports every day", a predetermined change operation may be performed to divide it into "I drove your car" and "to airports every day" as illustrated in FIG. 32. The predetermined change operation is not limited to a particular operation, and it may be, for example, a double tap or a long tap.

Furthermore, as illustrated in FIG. 32, there may be a case where the operation detection portion 143 detects a predetermined change operation. In this case, the processing unit acquisition portion 145 may decide the processing target U0 to be the processing unit to be divided and may decide the division position to be between "I drove your car" and "to airports every day", on the basis of the position at which the predetermined change operation is performed. Then, the processing unit acquisition portion 145 may acquire a processing unit U1 "I drove your car" and a processing unit U2 "to airports every day" by dividing the processing unit U0 to be divided at the division position.

Furthermore, as another example, the processing unit acquisition portion 145 may decide a processing unit to be divided on the basis of a position at which a predetermined change operation is performed, and may divide the processing unit to be divided into predetermined division units. The predetermined division unit may be a meaningful minimum unit. The meaningful minimum unit may be a morpheme unit for a language whose recognition string is not separately written, and may be a word unit for a language whose recognition string is separately written.

Figure 33:
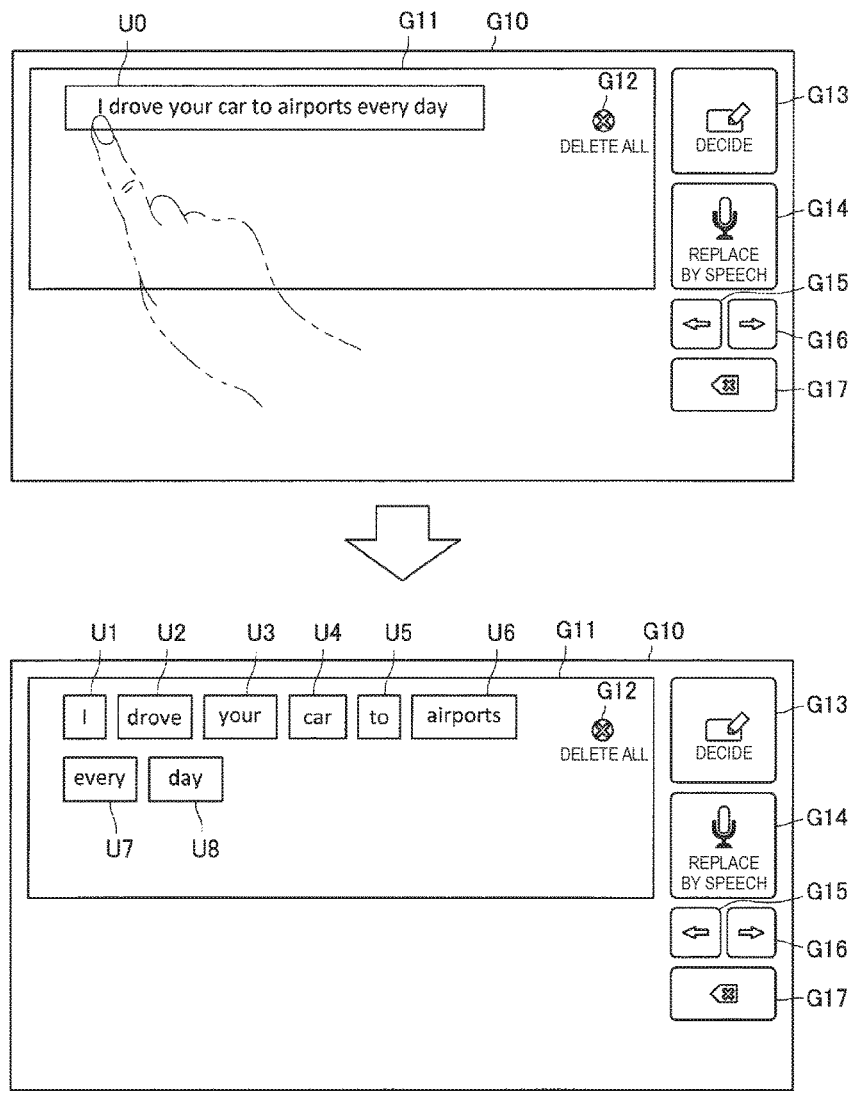
FIG. 33 is a diagram illustrated to describe another example of changing the number of processing units.

FIG. 33 is a diagram illustrated to describe another example of changing the number of processing units. Referring to FIG. 33, an example in which the processing unit acquisition portion 14 acquires the processing unit U0 "I drove your car to airports every day" is illustrated. In such a situation, when the user wants to divide the processing unit U0 "I drove your car to airports every day", a predetermined change operation may be performed on the processing unit U0 "I drove your car to airports every day" as illustrated in FIG. 33. The predetermined change operation is not limited to a particular operation, and it may be, for example, a double tap or a long tap.

Furthermore, as illustrated in FIG. 33, in the case where the operation detection portion 143 detects a predetermined change operation, the processing unit acquisition portion 145 may decide a processing unit to be divided on the basis of the position at which the predetermined change operation is performed. Then, the processing unit acquisition portion 145 may divide the processing unit U0 to be divided into word units, thereby acquiring a processing unit U1 "I", a processing unit U2 "drove", a processing unit U3 "your", a processing unit U4 "car", a processing unit U5 "to", a processing unit U6 "airports", a processing unit U7 "every", and a processing unit U8 "day".

[1.9. Deletion of Processing Unit]

Figure 34:
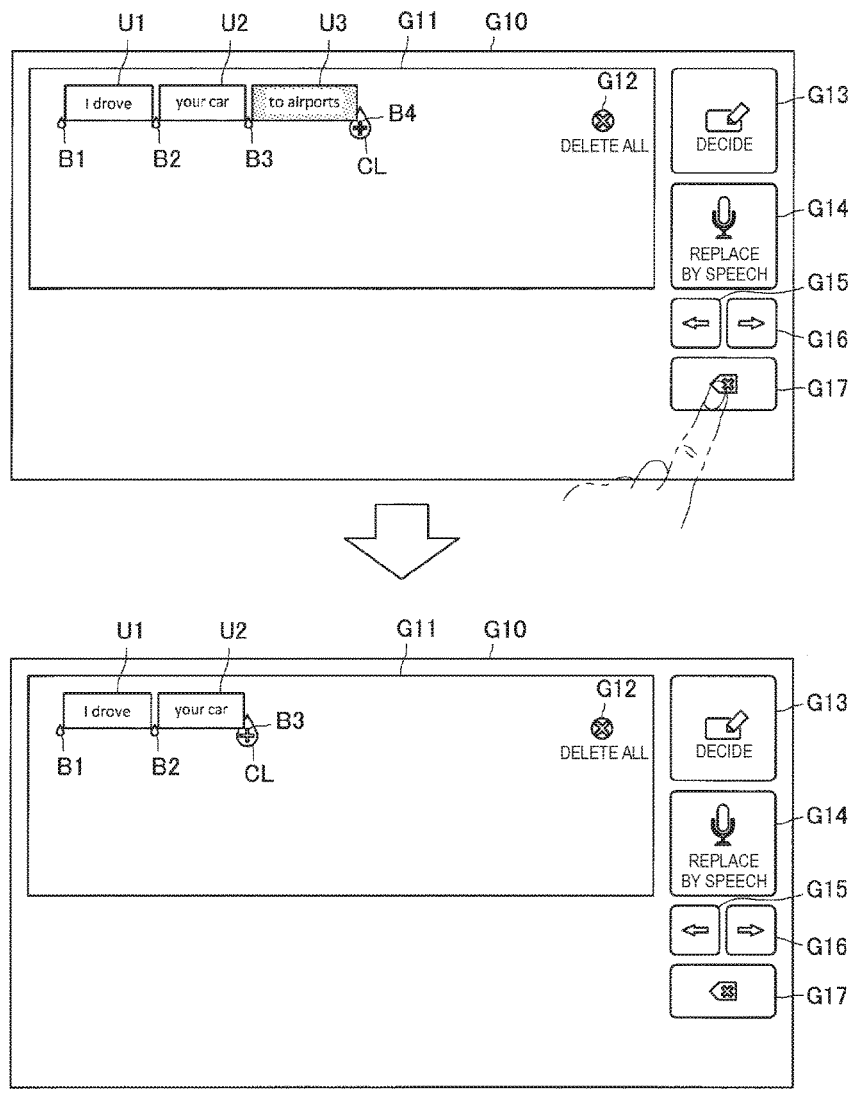
FIG. 34 is a diagram illustrated to describe deletion of processing units.

Although the above description is given as to an example of replacing the processing target, the ability to delete the processing target provides the user with convenience. Thus, in the case of deciding to delete the processing target, the processor 146 may delete the processing target. FIG. 34 is a diagram illustrated to describe deletion of the processing units. In one example, in the state in which the processing unit U3 "to airports" is selected as the processing target as illustrated in FIG. 34, if an operation of selecting an operation object G17 used to delete the processing target is detected, the processor 146 may delete the processing unit U3 "to airports".

[1.10. Selection of Caret Position]

In the above, the description is given as to an example of adding an additional string to the position at which the caret is present. In this example, in a case where the user wishes to add an additional string, it is necessary to specify the position of the caret. In this case, the user sometimes tries to specify the caret by a drag operation. In particular, the user who is accustomed to a terminal (e.g., a smartphone or the like) that is necessary to perform a drag operation to move an object on the screen may possibly try to perform a drag operation to specify the position of the caret.

However, there may be a situation where it is difficult to detect a drag operation. In one example, in the case where a user's operation is detected by the user's line of sight, it is necessary to detect the drag operation on the basis of the user's line of sight, which is likely to deteriorate the detection accuracy of the drag operation. Furthermore, in one example, in the case where the user's operation is detected by analyzing an image, it is necessary to detect the drag operation by the user on the basis of the analysis result of the image, which is likely to deteriorate the detection accuracy of the drag operation. Thus, it is preferable to specify the caret position by a selection operation (e.g., a tapping operation).

Specifically, in the case where a displayed caret position selection object is selected, the display controller 147 may select a position at which the caret position selection object is present as the position of the caret. FIG. 35 is a diagram illustrated to describe selection of the caret position. In one example, as illustrated in FIG. 35, there may be a case where the selection operation is performed on a caret position selection object B4 in a state where the processing unit U3 is selected as a processing target. In this case, the display controller 147 may select the position of the caret position selection object B4 as the position of the caret CL.

FIG. 36 is a diagram illustrated to describe selection of the caret position. In one example, as illustrated in FIG. 36, there may be the case where the selection operation is performed on a caret position selection object B3 in a state where the processing unit U3 is selected as a processing target. In this case, the display controller 147 may select the position of the caret position selection object B4 as the position of the caret CL.

Figure 37:
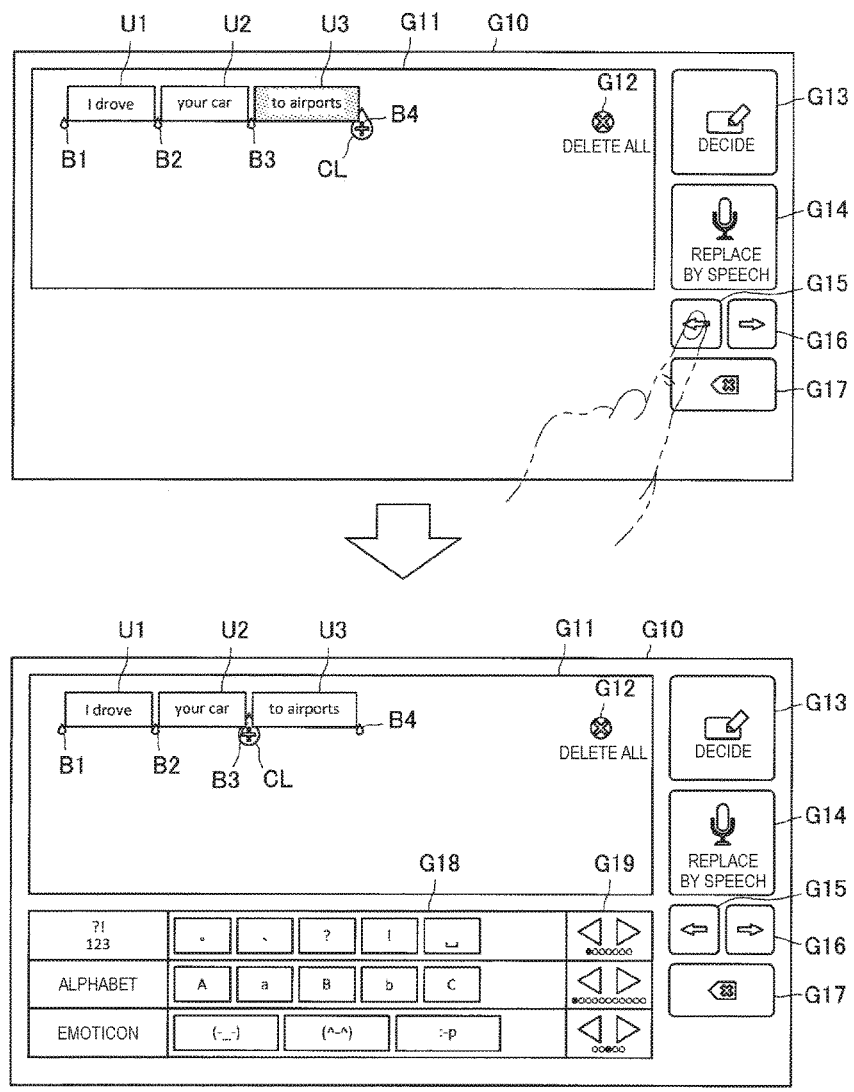
FIG. 37 is a diagram illustrated to describe selection of a caret position.

FIG. 37 is a diagram illustrated to describe selection of the caret position. As illustrated in FIG. 37, there may be the case where the selection operation is performed on an operation object G15 used to move the caret position to the preceding position in a state where the position of the caret CL is the position of the position selection object B4. In this case, the display controller 147 may select the position of the caret position selection object B3 preceding the caret position selection object B4 as the position of the caret CL.

[1.11. Display Area of Processing Unit]

In the above, the description is given as to the example in which the position of the caret position selection object selected by the user's selection operation is selected as the position of the caret. However, there may be situations in which it is difficult to perform accurately the selection operation on the caret position selection object. In one example, in the case where the user's operation is detected by the user's line of sight, it is necessary to detect the selection operation on the basis of the user's line of sight, which is likely to deteriorate the detection accuracy of the selection operation. In addition, in one example, in the case where a user's operation is detected by analyzing an image, it is necessary to detect the selection operation by the user on the basis of the analysis result of the image, which is likely to deteriorate the detection accuracy of the selection operation. Thus, it is preferable to specify the caret position by the tapping operation.

Specifically, the display area of the processing unit is set to include the left side region, the central region, and the right side region. It is preferable that the left side region is the selection region of the caret position selection object positioned on the left side of the processing unit, the central region is the selection region of the processing unit, and the right side region is the selection region of the caret position selection object positioned on the right side of the processing unit. Examples of the operation in the case where the central region, the left side region, and the right side region are selected are described sequentially.

Figure 38:
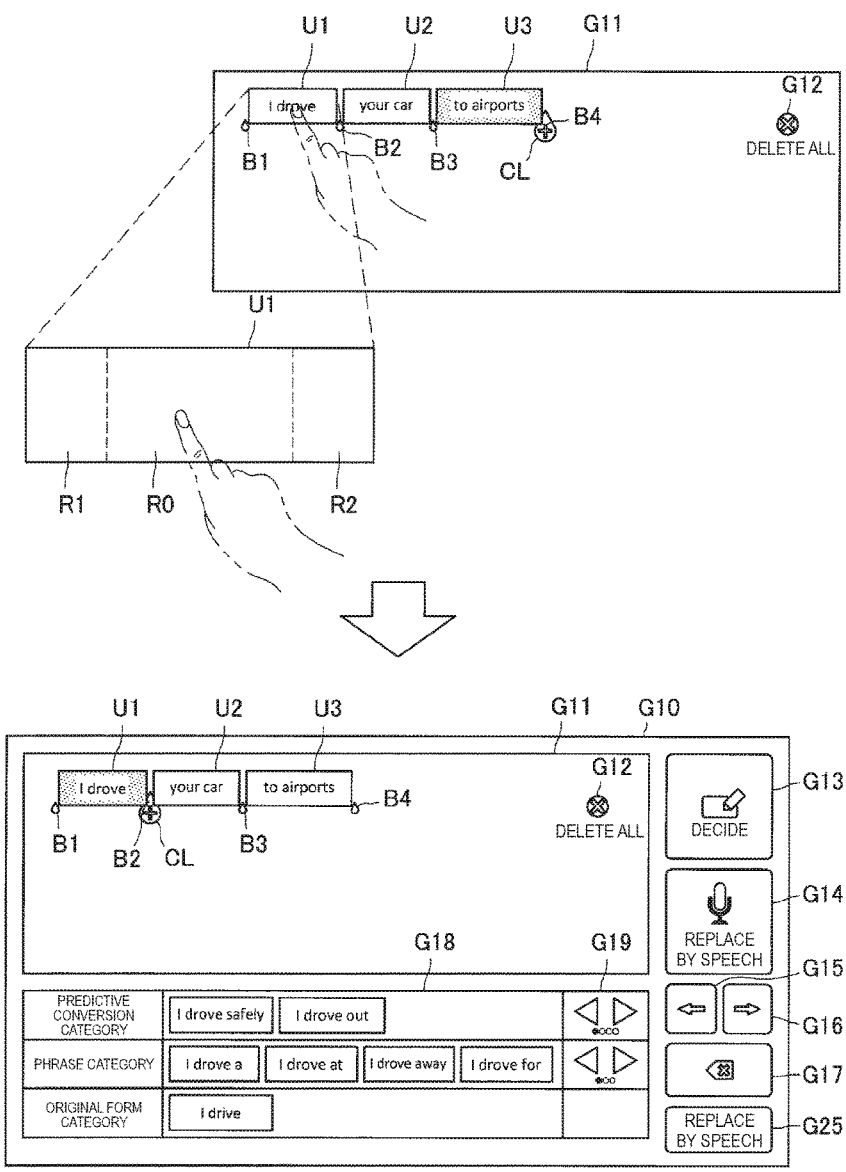
FIG. 38 is a diagram illustrated to describe an operation in a case where a central region is selected.

FIG. 38 is a diagram illustrated to describe an operation in the case where the central region R0 is selected. As illustrated in FIG. 38, the display area of a processing unit U1 includes a left side region R1, the central region R0, and a right side region R2. In this regard, as illustrated in FIG. 38, in the case where an operation of selecting the central region R0 is detected, the processor 146 may select the processing unit U1 as a processing target. Moreover, the length of each of the left side region R1, the central region R0, and the right side region R2 are not limited to a particular length. The processor 146 may control the length of each of the left side region R1 and the right side region R2 depending on the length of the processing unit U1.

In one example, in the case where the length of the processing unit U1 exceeds a threshold, the selection operation on the left side region R1 is easy to be performed, which may be comparable to that on the right side region R2. Thus, in the case where the length of the processing unit U1 exceeds a threshold, the processor 146 may set the sizes of the left side region R1 and the right side region R2 to be identical to each other. On the other hand, in one example, in the case where the length of the processing unit U1 is below the threshold, the region on the dominant arm side of the user is conceivable to be easily performed as a region to be selected. Thus, in the case where the length of the processing unit U1 is below the threshold, the processor 146 may set the region on the opposite side to the dominant arm of the left side region R1 and the right side region R2 to be narrower than the region on the dominant arm side of the user.

Although the dominant arm of the user may be determined in any way, in one example, the processor 146 may determine the dominant arm in accordance with which of the left and right fingers of the user who performs the operation of selecting the speech-based string addition start operation object G14 is used. In one example, the processor 146 determines the shape of the finger of the user who performs the operation of selecting the speech-based string addition start operation object G14 from the input image input by the image input portion 110. Then, the processor 146 determines which of the left and right fingers of the user is used on the basis of the shape of the finger, and thus may determine the dominant arm on the basis of the determination result.

Figure 39:
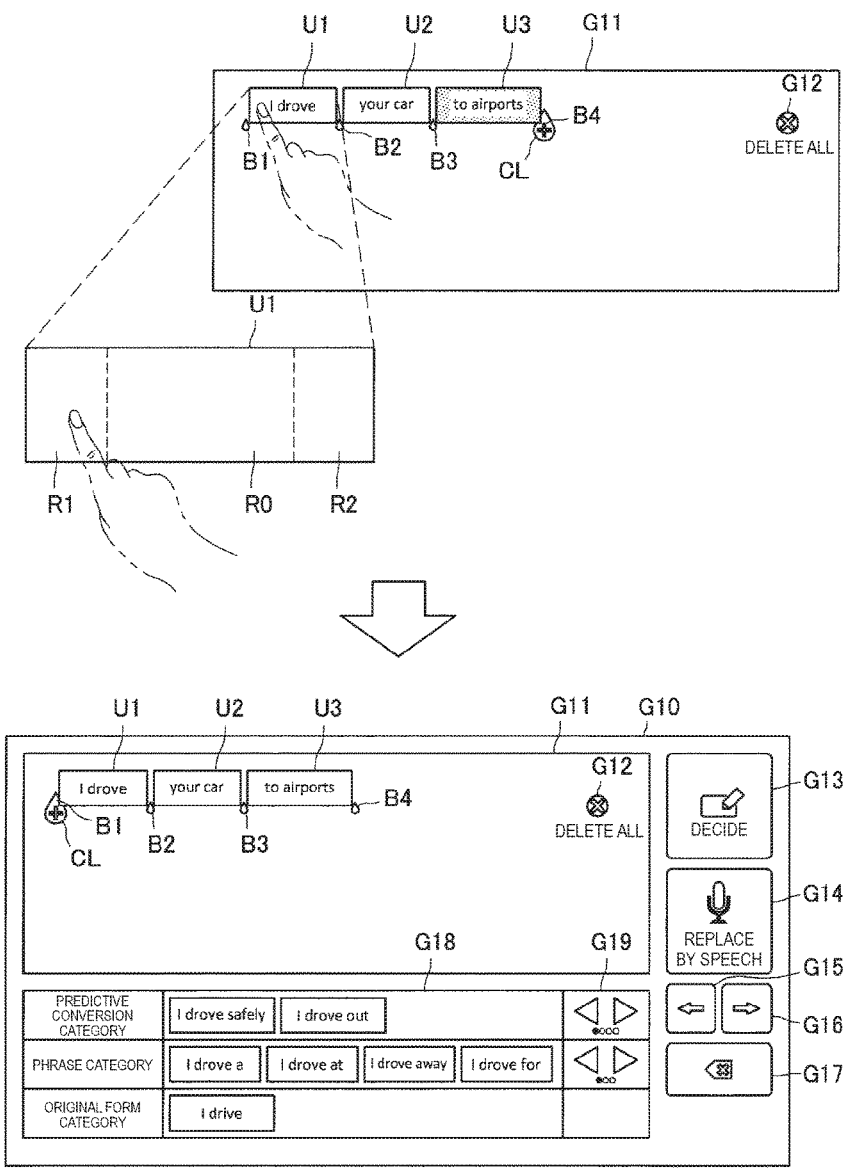
FIG. 39 is a diagram illustrated to describe an operation in a case where a left side region is selected.
Figure 40:
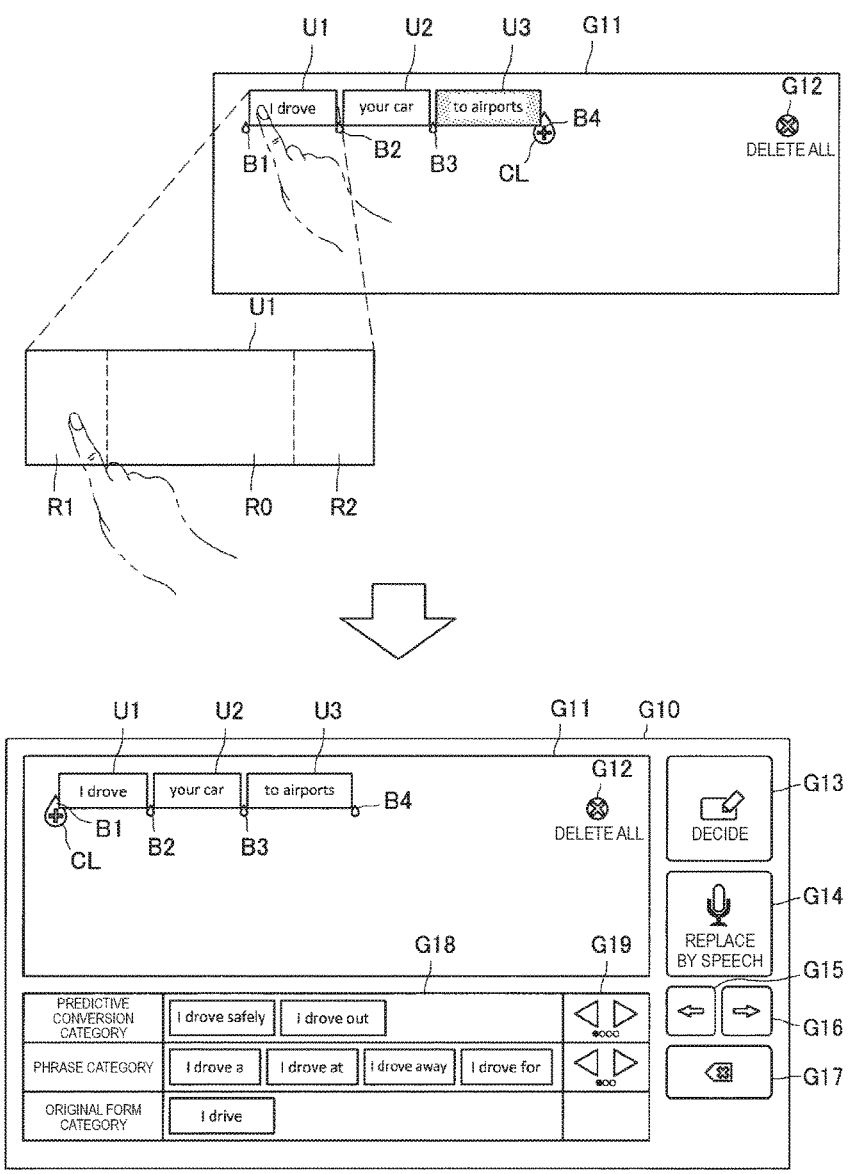
FIG. 40 is a diagram illustrated to describe an operation in a case where a right side region is selected.

FIG. 39 is a diagram illustrated to describe an operation in the case where the left side region R1 is selected. As illustrated in FIG. 39, in the case where an operation of selecting the left side region R1 is detected, the processor 146 may select the caret position selection object B1 located on the left side of the processing unit U1 as the position of the caret CL. FIG. 40 is a diagram illustrated to describe the operation in the case where the right side region R2 is selected. As illustrated in FIG. 40, in the case where an operation of selecting the right side region R2 is detected, the processor 146 may select the caret position selection object B2 located on the right side of the processing unit U1 as the position of the caret CL.

Figure 41:
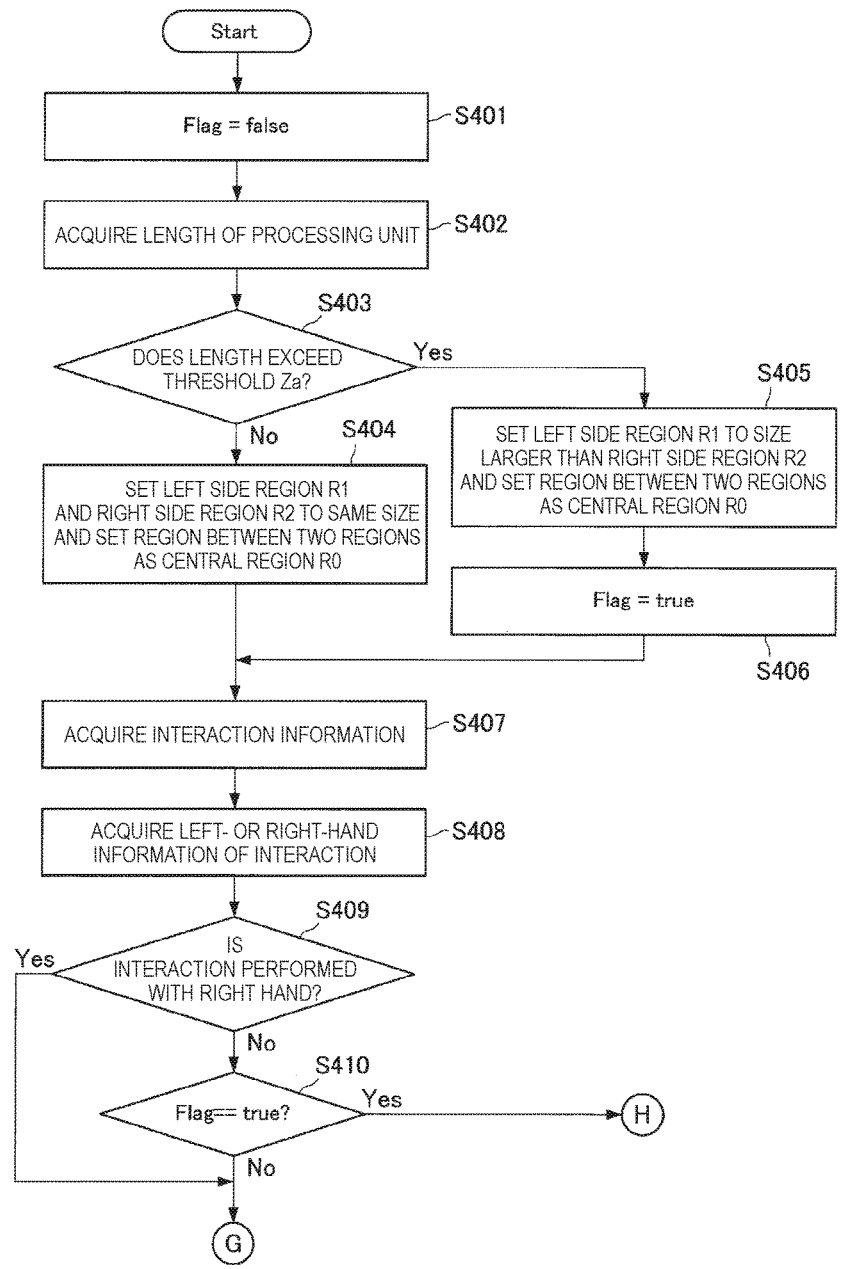
FIG. 41 is a flowchart showing an example of an operation when a display area of a processing unit is selected.
Figure 42:
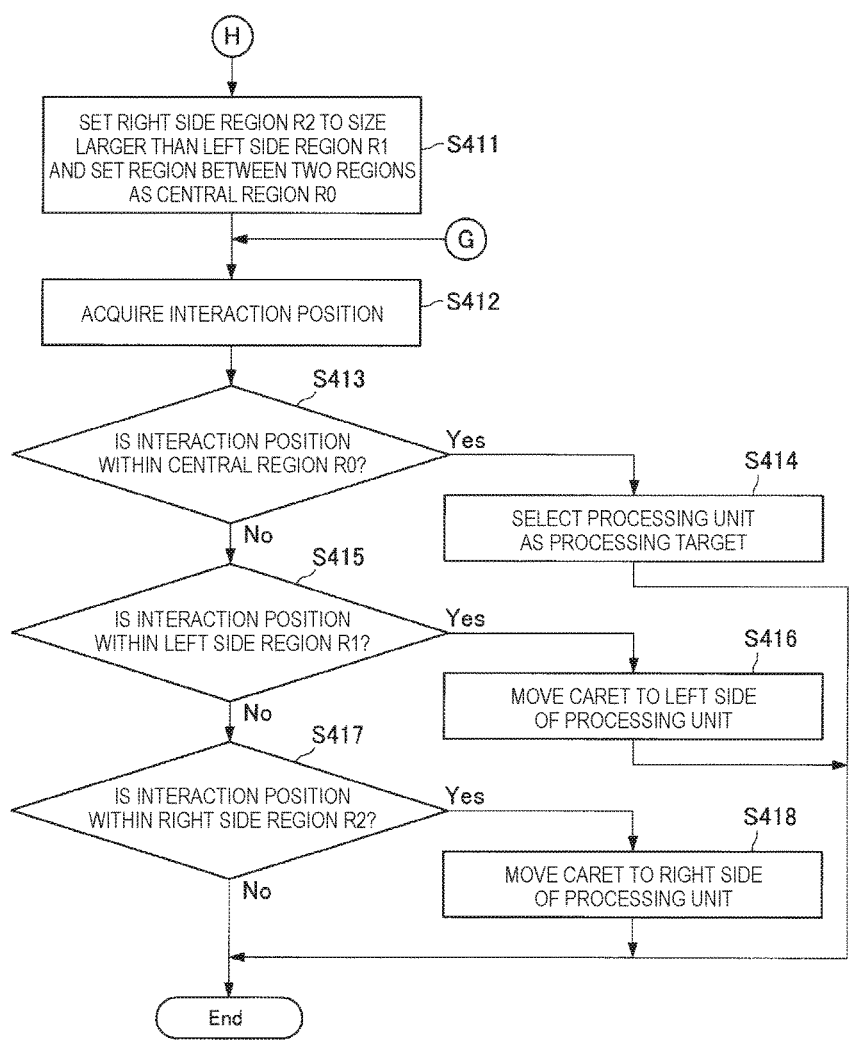
FIG. 42 is a flowchart showing an example of an operation when a display area of a processing unit is selected.

Subsequently, the operation performed in the case of selecting the display area of the processing unit is described. FIGS. 41 and 42 are flowcharts showing an example of the operation performed in the case of selection. Moreover, these flowcharts merely show an example of the operation performed in the case of selecting the display area of the processing unit, so the operation performed in the case of selecting the display area of the processing unit is not limited to the example shown in these flowcharts. The processor 146 sets Flg to false (S401), and acquires the length of the processing unit (S402). Subsequently, if the length of the processing unit is below a threshold value Za ("No" in S403), the processor 146 sets the left side region R1 and the right side region R2 to the same size (S404), and sets a region between these two regions as the central region R0. On the other hand, if the length of the processing unit exceeds the threshold value Za ("Yes" in S403), the processor 146 sets the left side region R1 to a size larger than the right side region R2 (S405), sets a region between these two regions as the central region R0, and sets Flg to true (S406).

Subsequently, the processor 146 acquires the user interaction information (S407), and acquires left- or right-hand information of interaction (S408). If the interaction is performed with the user's right hand ("Yes" in S409), the processor 146 shifts the operation to S412. On the other hand, if the interaction is made by the left hand of the user ("No" in S409) and the Flg is set to false ("No" in S410), the processor 146 shifts the operation to S412. If the interaction is performed by the user's left hand ("No" in S409) and the Flg is set to true ("Yes" in S410), the processor 146 sets the right side region R2 to a size larger than the left side region R1, and sets a region between these two regions as the central region R0 (S411).

Subsequently, the processor 146 acquires the interaction position (S412). If the interaction position is within the central region R0 ("Yes" in S413), the processor 146 selects the processing unit as a processing target (S414), and terminates the operation. On the other hand, if the interaction position is within the left side region R1 ("No" in S413 and then "Yes" in S415), the display controller 147 moves the caret to the left side of the processing unit and terminates the operation.

If the interaction position is within the right side region R2 ("No" in S413, and "No" in S415, then "Yes" in S417), the display control section 147 moves the caret to the right side of the processing unit, and then terminates the operation. If the interaction position is not within any of the central region R0, the left side region R1, and the right side region R2 ("No" in S413, and "No" in S415, then "No" in S417), the processor 146 terminates the operation.

[1.12. Modified Example of Display Form]

The above description is given as to the example in which the display portion 130 is a projector capable of projecting a screen onto the top surface of the table Tb1. However, the display form of the display portion 130 is not limited to this example. FIG. 43 is a diagram illustrating a modified example of the display form of the display portion 130. As illustrated in FIG. 43, in the case where the information processing system 10 is a mobile terminal, the display portion 130 may be provided in the mobile terminal. The type of the mobile terminal is not limited to a particular type, and it may be a tablet terminal, a smartphone, or a cellular phone.

[1.13. Hardware Configuration Example]

Next, the hardware configuration of the information processing system 10 according to an embodiment of the present disclosure is described with reference to FIG. 44. FIG. 44 is a block diagram illustrating a hardware configuration example of the information processing system 10 according to an embodiment of the present disclosure.

As illustrated in FIG. 44, the information processing system 10 includes a central processing unit (CPU) 901, a read only memory (ROM) 903, and a random access memory (RAM) 905. In addition, the information processing system 10 may include a host bus 907, a bridge 909, an external bus 911, an interface 913, an input device 915, an output device 917, a storage device 919, a drive 921, a connection port 923, and a communication device 925. The information processing system 10 may further include an image capturing device 933 and a sensor 935 as necessary. In conjunction with, or in place of, the CPU 901, the information processing system 10 may have a processing circuit called a digital signal processor (DSP) or application specific integrated circuit (ASIC).

The CPU 901 functions as an arithmetic processing unit and a control device, and controls the overall operation in the information processing system 10 or a part thereof in accordance with various programs recorded in the ROM 903, the RAM 905, the storage device 919, or the removable recording medium 927. The ROM 903 stores, for example, programs and operation parameters used by the CPU 901. The RAM 905 temporarily stores, for example, programs to be used in the execution by the CPU 901 and parameters that change as appropriate in executing the programs. The CPU 901, the ROM 903, and the RAM 905 are connected with each other via a host bus 907 that is composed of an internal bus such as a CPU bus. Furthermore, the host bus 907 is connected to an external bus 911 such as peripheral component interconnect (PCI)/interface bus via a bridge 909.

The input device 915 is, for example, a device operated by a user, such as a mouse, a keyboard, a touch panel, a button, a switch, and a lever. The input device 915 may include a microphone for detecting user's voice. The input device 915 may be, for example, a remote control device using infrared rays or other radio waves, or may be an external connection device 929 such as a cellular phone conforming to the operation of the information processing system 10. The input device 915 includes an input control circuit that generates an input signal on the basis of the information input by the user and outputs it to the CPU 901. The user inputs various data to the information processing system 10 and instructs the information processing system 10 to perform a processing operation by operating the input device 915. In addition, the image capturing device 933, which will be described later, can also function as an input device by capturing the movement of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing system 10 as a video such as a text or an image, or outputs it as audio such as a voice or sound. In addition, the output device 917 may include, for example, a light for lighting up the surroundings.

The storage device 919 is a data storage device configured as an example of a storage portion of the information processing system 10. The storage device 919 is composed of, for example, a magnetic storage device such as hard disk drives (HDDs), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing system 10 or externally attached thereto. The drive 921 reads the information recorded in the attached removable recording medium 927 and outputs it to the RAM 905. In addition, the drive 921 writes in the attached removable recording medium 927.

The connection port 923 is a port for directly connecting the device to the information processing system 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The external connection device 929 is connected to the connection port 923, and thus various kinds of data can be exchanged between the information processing system 10 and the external connection device 929.

The communication device 925 is, for example, a communication interface composed of a communication device or the like, which is used to be connected to the communication network 931. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 931 connected to the communication device 925 is a network connected by wire or wireless, and is, for example, the Internet, home LAN, infrared communication, radio wave communication, satellite communication, or the like.

The image capturing device 933 captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an accelerometer, a gyro sensor, a geomagnetic sensor, a photosensor, and a sound sensor. The sensor 935 acquires information on the state of the information processing system 10 itself, such as the attitude of the casing of the information processing system 10, and information on the surrounding environment of the information processing system 10 such as brightness or noise around the information processing system 10. The sensor 935 may also include a GPS sensor, which receives global positioning system (GPS) signals and measures the latitude, longitude, and altitude of the device.

The above description is given as to the example of the hardware configuration of the information processing system 10. Each of the components described above may be configured using a general-purpose member, or may be configured with hardware dedicated to the function of each component. Such a configuration can be changed appropriately depending on the technical level at the time of implementation.

2. Conclusion

As described above, according to an embodiment of the present disclosure, there is provided the information processing device 140 including the processing unit acquisition portion 145 and the processor 146. The processing unit acquisition portion 145 acquires one or more processing units from the first recognition string obtained by performing speech recognition on the first input speech on the basis of the noise volume. The processor 146 processes a processing target in the case where any one of one or more processing units is selected as the processing target. This configuration makes it possible to perform more efficiently processing on a string recognized from input speech.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The above description is given as to the modified example of the display form of the display portion 130, but the display form of the display portion 130 is not limited to the above example. The display portion 130 may be, for example, a display provided in a wearable terminal (e.g., a watch or glasses) other than the head mounted display. In addition, the display portion 130 may be, for example, a display provided in an in-vehicle navigation system. In addition, the display portion 130 may be, for example, a display used in the healthcare field.

The above description is given as to an example in which the processing unit acquisition portion 145 obtains one or a plurality of processing units from the recognition string on the basis of the noise volume. However, other noise information may be used in place of the noise volume. In one example, the processing unit acquisition portion 145 may obtain one or a plurality of processing units from the recognition string on the basis of the sound pressure of noise. In such a case, the processing unit acquisition portion 145 may decrease the number of processing units as the sound pressure of noise increases. In addition, in one example, the processing unit acquisition portion 145 may obtain one or a plurality of processing units from the recognition string on the basis of the sound pressure level of noise. In such a case, the processing unit acquisition portion 145 may decrease the number of processing units as the sound pressure level of noise increases.

Alternatively, the processing unit acquisition portion 145 may obtain one or a plurality of processing units from the recognition string on the basis of the frequency of noise.

Furthermore, it is possible to create a program for causing the hardware such as CPU, ROM and RAM incorporated in the computer to execute functions equivalent to those of the information processing system 10 as described above. In addition, a computer-readable recording medium on which the program is recorded can also be provided.

Furthermore, the display controller 147 generates display control information for displaying the display content on the display portion 130 and outputs the generated display control information to the display portion 130, and thus can control the display portion 130 so that the display portion 130 displays the display content. The contents of the display control information may be changed appropriately in accordance with the system configuration.

Specifically, the program used to implement the information processing device 140 may be, for example, a web application. In such a case, the display control information may be created using markup languages such as hypertext markup language (HTML), standard generalized markup language (SGML), and extensible markup language (XML).

The position of each component is not limited to a particular position as long as the operation of the information processing system 10 described above is performed. In one specific example, the image input portion 110, the operation input portion 115, the speech input portion 120, the display portion 130, and the information processing device 140 may be provided in different devices connected via a network. In this case, the information processing device 140 corresponds to, for example, a server such as a web server or a cloud server, and the image input portion 110, the operation input portion 115, the speech input portion 120, and the display portion 130 may correspond to a client connected to the server via a network.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a processing unit acquisition portion configured to acquire one or more processing units, on the basis of noise, from a first recognition string obtained by performing speech recognition on first input speech; and
a processor configured to, when any one of the one or more processing units is selected as a processing target, process the processing target.

(2)
The information processing device according to (1),
wherein the processing unit acquisition portion acquires the one or more processing units from the first recognition string on the basis of a noise volume.

(3)
The information processing device according to (2),
wherein processing unit acquisition portion decreases the number of the processing units as the noise volume increases.

(4)
The information processing device according to any one of (1) to (3), further including:
a display controller configured to control a display portion so that the display portion displays the one or more processing units.

(5)
The information processing device according to (4),
wherein the processor, when a correction string is selected from one or more correction candidate strings, corrects the processing target by replacing the processing target with the correction string.

(6)
The information processing device according to (5),
wherein the display controller causes the display portion to display the one or more correction candidate strings for each category.

(7)
The information processing device according to (4),
wherein the processor, when an additional string is selected from one or more additional candidate strings, adds the additional string to a position at which a caret is present.

(8)
The information processing device according to (7),
wherein the display controller causes the display portion to display the one or more additional candidate strings for each category.

(9)
The information processing device according to any one of (1) to (8),
wherein the processing unit acquisition portion, when a predetermined change operation is input, changes the number of processing units included in at least any one of the one or more processing units.

(10)
The information processing device according to any one of (1) to (9),
wherein the processor, when second input speech is input, corrects the processing target by replacing the processing target with a second recognition string obtained by performing speech recognition on the second input speech.

(11)
The information processing device according to (4),
wherein the display controller, when a caret position selection object is selected, selects a position at which the caret position selection object is present as a position of a caret.

(12)
The information processing device according to (11),
wherein a display area of the processing unit includes a left side region, a central region, and a right side region,
wherein the left side region is a region for selecting the caret position selection object located on a left side of the processing unit, the central region is a region for selecting the processing unit, and the right side region is a region for selecting the caret position selection object located on a right side of the processing unit.

(13)
The information processing device according to (12),
wherein the processor controls a length of each of the left side region and the right side region depending on a length of the processing unit.

(14)
The information processing device according to any one of (1) to (13),
wherein the processor, when the processing target is decided to be deleted, deletes the processing target.

(15)
The information processing device according to (4),
wherein the processor, when the processing target is decided to be corrected by speech, controls a length of the processing target.

(16)
The information processing device according to (15),
wherein the processor, when the processing target is decided to be corrected by speech, controls the length of the processing target on the basis of a noise volume.

(17)
The information processing device according to (16),
wherein the processor, when the processing target is decided to be corrected by speech, increases the length of the processing target as the noise volume increases.

(18)
The information processing device according to (16),
wherein, after controlling the length of the processing target, the display controller causes the display portion to display a message prompting a speech input depending on the controlled length of the processing target.

(19)
The information processing device according to (15),
wherein the processor, when the processing target is decided to be corrected by speech, determines whether to include a word being present in at least one of positions preceding and following the processing target in the processing target depending on a part of speech of the word.

(20)
The information processing device according to (1),
wherein the processing unit acquisition portion acquires the one or more processing units from the first recognition string on the basis of sound pressure of noise.

(21)
The information processing device according to (1),
wherein the processing unit acquisition portion acquires the one or more processing units from the first recognition string on the basis of a sound pressure level of noise.

(22)
A method of information processing, the method including:
acquiring one or more processing units, on the basis of noise, from a first recognition string obtained by performing speech recognition on first input speech; and
when any one of the one or more processing units is selected as a processing target, processing the processing target.

(23)

A program for causing a computer to function as an information processing device including:

a processing unit acquisition portion configured to acquire one or more processing units, on the basis of noise, from a first recognition string obtained by performing speech recognition on first input speech; and a processor configured to, when any one of the one or more processing units is selected as a processing target, process the processing target.

REFERENCE SIGNS LIST

10 Information processing system
110 image input portion
115 operation input portion
120 speech input portion
130 display portion
140 information processing device (controller)
141 input image acquisition portion
142 input sound acquisition portion
143 operation detection portion
144 speech recognition portion
145 processing unit acquisition portion
146 processor
147 display controller
B1-B4 caret position selection object
CL caret
R0 central region
R1 left side region
R2 right side region
U0-U8 processing unit

The invention claimed is:

1. An information processing device, comprising:
circuitry configured to:
execute speech recognition on first input speech to obtain first recognition string;
acquire a plurality of processing units from the first recognition string based on a noise volume;
decrease a number of the plurality of processing units based on an increase of the noise volume by increasing a length of a processing unit of the plurality of processing units;
display the number of the plurality of processing units to a user;
select, as a processing target, the processing unit from the plurality of processing units based on an operation of the user; and
process the processing target.

2. The information processing device according to claim 1, wherein the circuitry is further configured to control a display screen to display the plurality of processing units.

3. The information processing device according to claim 2, wherein
the circuitry is further configured to replace the processing target with a correction string to correct the Processing target, and
the replacement is based on selection of the correction string from a plurality of correction candidate strings.

4. The information processing device according to claim 3, wherein the circuitry is further configured to control the display screen to display the plurality of correction candidate strings for each category.

5. The information processing device according to claim 2, wherein
the circuitry is further configured to add an additional string to a position on the display screen at which a caret is present, and
the addition of the additional string is based on selection of the additional string from a plurality of additional candidate strings.

6. The information processing device according to claim 5, wherein the circuitry is further configured to control the display screen to display the plurality of additional candidate strings for each category.

7. The information processing device according to claim 2, wherein the circuitry is further configured to select, based on selection of a caret position selection object, a position on the display screen at which the caret position selection object is present as a position of a caret.

8. The information processing device according to claim 7, wherein
a display area of the processing unit includes a left side region, a central region, and a right side region,
the left side region is a region for the selection of the caret position selection object located on a left side of the processing unit,
the central region is a region for the selection of the processing unit, and
the right side region is a region for the selection of the caret position selection object located on a right side of the processing unit.

9. The information processing device according to claim 8, wherein the circuitry is further configured to control a length of each of the left side region and the right side region based on the length of the processing unit.

10. The information processing device according to claim 2, wherein the circuitry is further configured to:
determine the processing target is to be corrected by speech; and
control a length of the processing target based on the determination.

11. The information processing device according to claim 10, wherein the circuitry is further configured to control the length of the processing target based on the noise volume.

12. The information processing device according to claim 11, wherein the circuitry is further configured to increase the length of the processing target based on the increase of the noise volume.

13. The information processing device according to claim 11, wherein the circuitry is further configured to control the display screen, based on the controlled length of the processing target, to display a message that prompts a speech input.

14. The information processing device according to claim 10, wherein
the circuitry is further configured to determine to include a word in the processing target based on a part of speech of the word and the determination that the processing target is to be corrected by the speech, and
the word is present in at least one of a first position preceding the processing target or a second position following the processing target.

15. The information processing device according to claim 1, wherein the circuitry is further configured to change, based on a specific change operation, a number of processing units included in at least one of the plurality of processing units.

16. The information processing device according to claim 1, wherein the circuitry is further configured to:

execute the speech recognition on second input speech to obtain second recognition string; and replace the processing target with the second recognition string to correct the processing target.

17. The information processing device according to claim 1, wherein the circuitry is further configured to:

determine the processing target is to be deleted; and delete the processing target based on the determination.

18. The information processing device according to claim 1, wherein the circuitry is further configured to acquire the plurality of processing units from the first recognition string based on sound pressure of noise.

19. The information processing device according to claim 1, wherein the circuitry is further configured to acquire the plurality of processing units from the first recognition string based on a sound pressure level of noise.

20. A method of information processing, the method comprising:

executing speech recognition on input speech to obtain recognition string;

acquiring a plurality of processing units from the recognition string based on a noise volume;

decreasing a number of the plurality of processing units based on an increase of the noise volume by increasing a length of a processing unit of the plurality of processing units;

displaying the number of the plurality of processing units to a user;

selecting, as a processing target, the processing unit from the plurality of processing units based on an operation of the user; and processing the processing target.

21. A non-transitory computer-readable medium having stored thereon computer-executable instructions that, when executed by a processor, cause the processor to execute operations, the operations comprising:

executing speech recognition on input speech to obtain recognition string;

acquiring a plurality of processing units from the recognition string based on a noise volume;

decreasing a number of the plurality of processing units based on an increase of the noise volume by increasing a length of a processing unit of the plurality of processing units;

displaying the number of the plurality of processing units to a user;

selecting, as a processing target, the processing unit from the plurality of processing units based on an operation of the user; and processing the processing target.

* * * * *